Nov. 28, 1967

P. R. O'BRIEN 3,355,266

BLANKS FOR VEHICLE BUMPERS

Original Filed Oct. 26, 1960

INVENTOR
PAUL R. O'BRIEN

BY *Glenn, Palmer & Matthews*

HIS ATTORNEYS

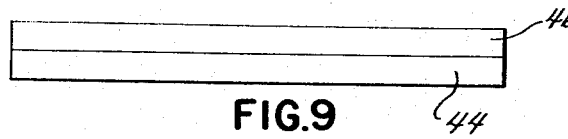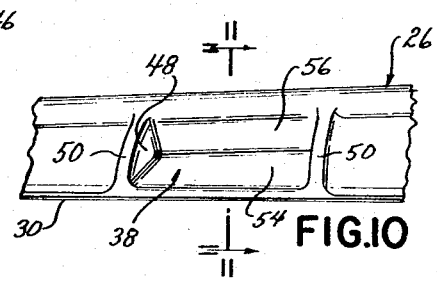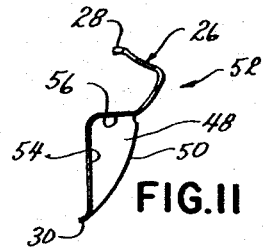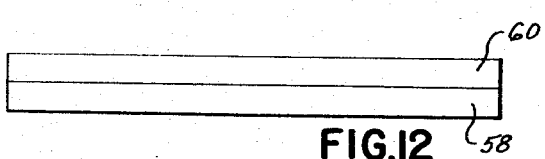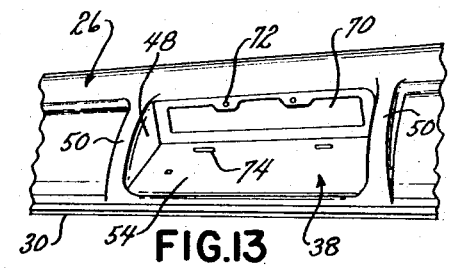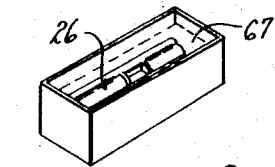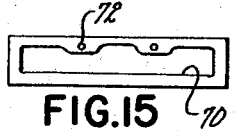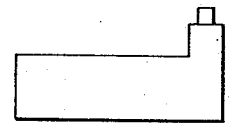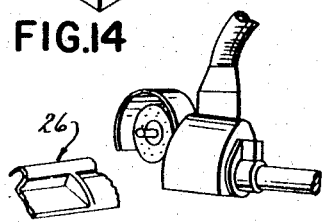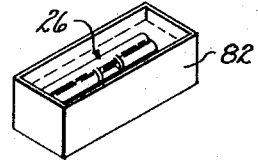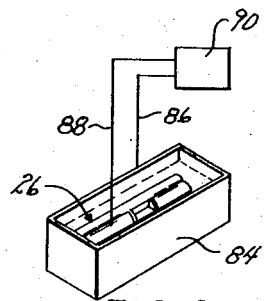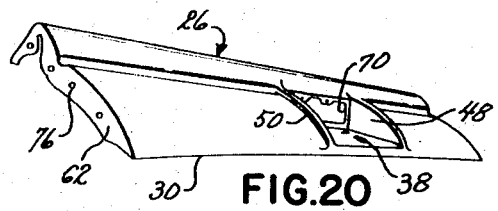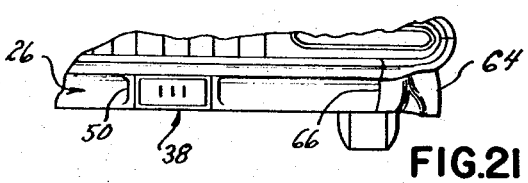

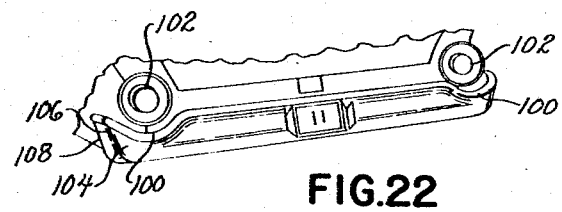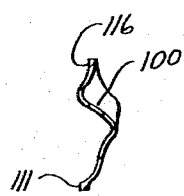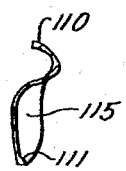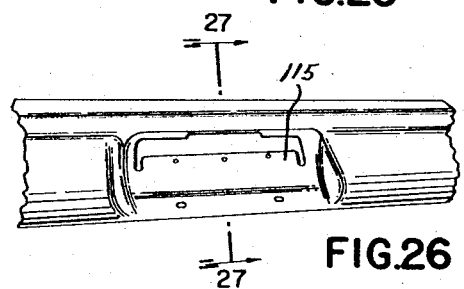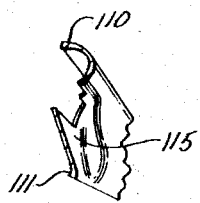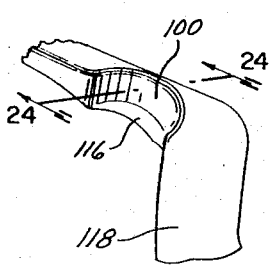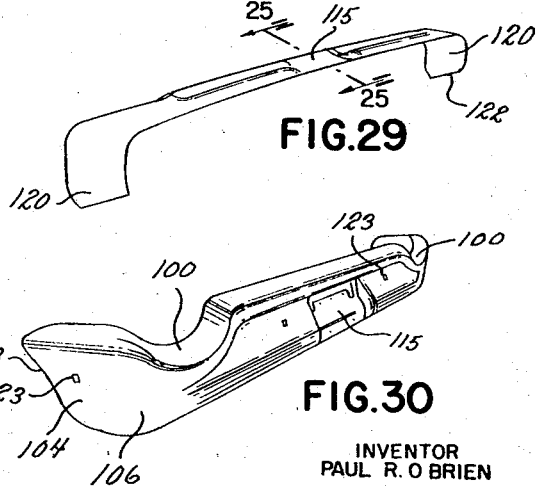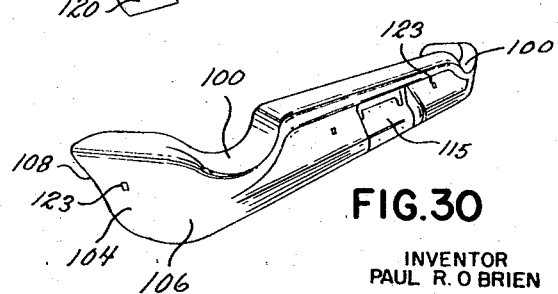

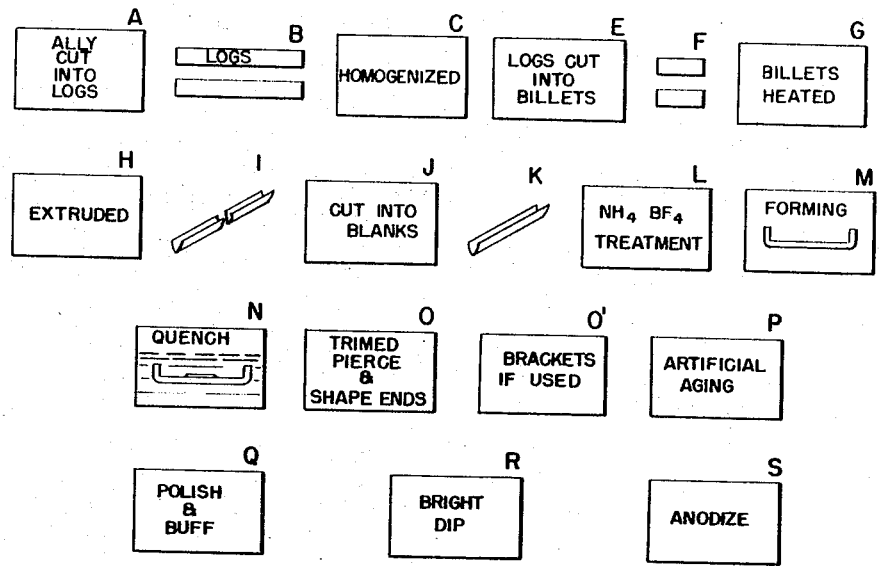
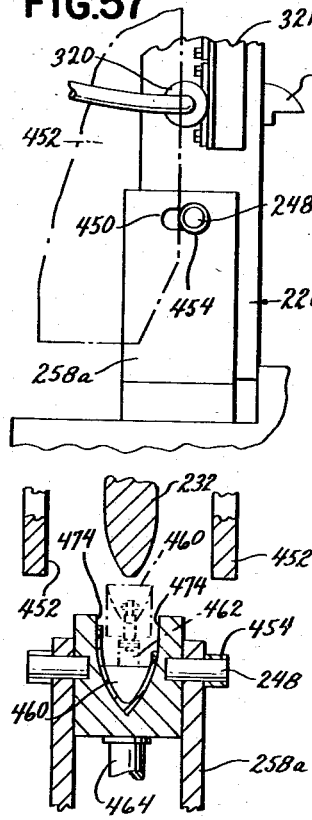
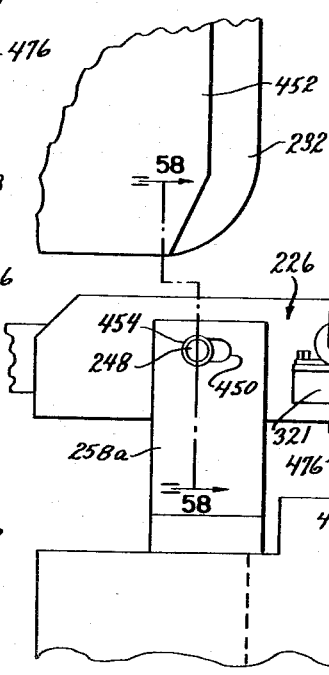
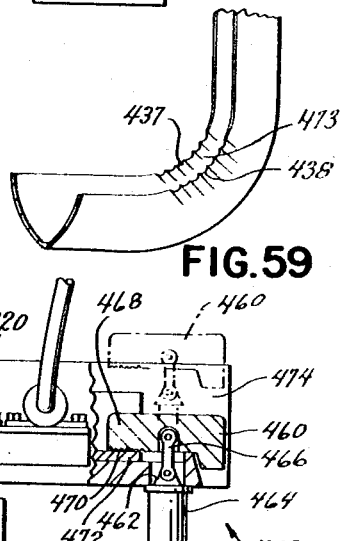
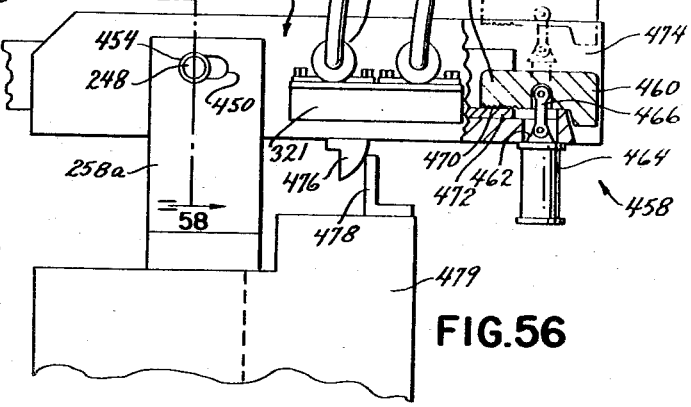
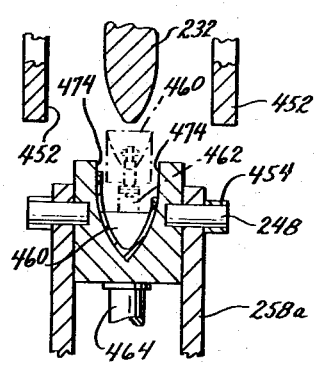

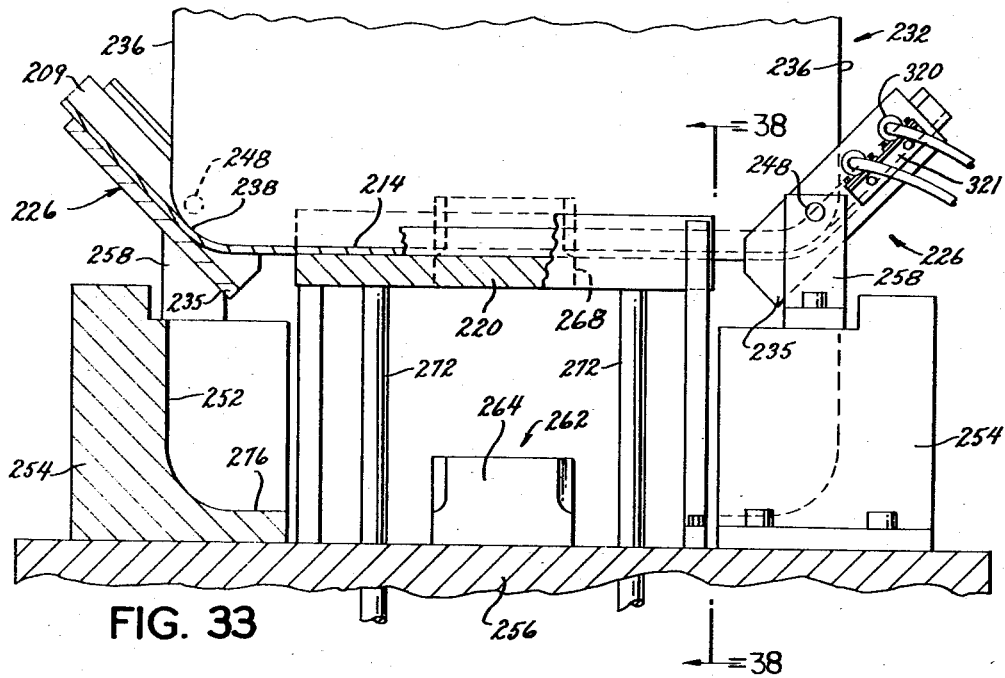
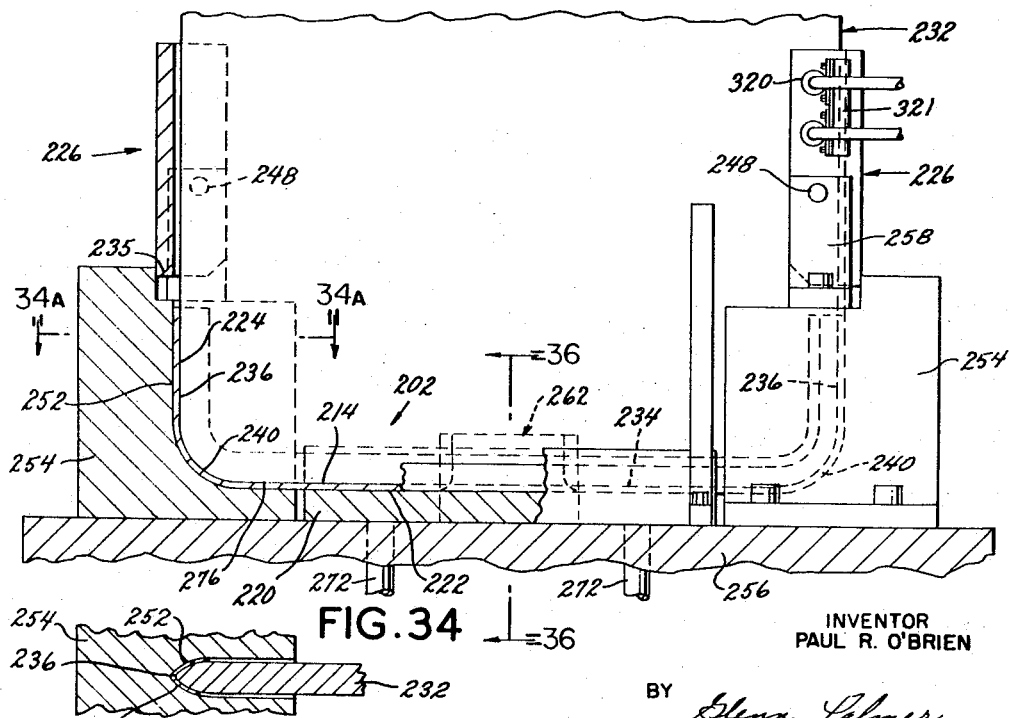

Nov. 28, 1967  P. R. O'BRIEN  3,355,266
BLANKS FOR VEHICLE BUMPERS
Original Filed Oct. 26, 1960  15 Sheets-Sheet 7
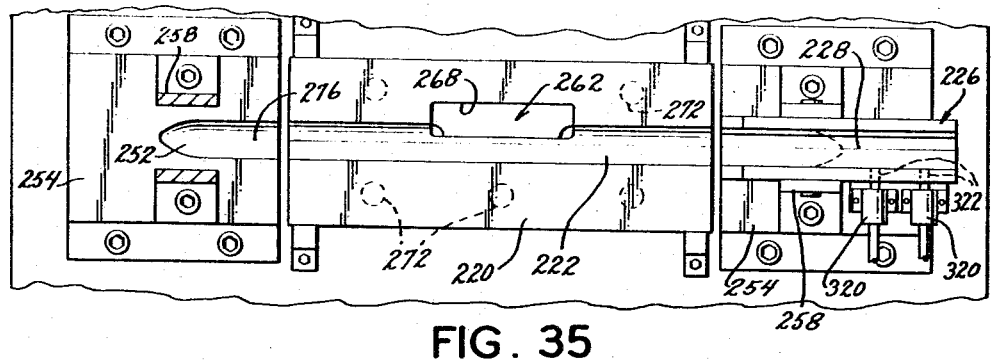
FIG. 35
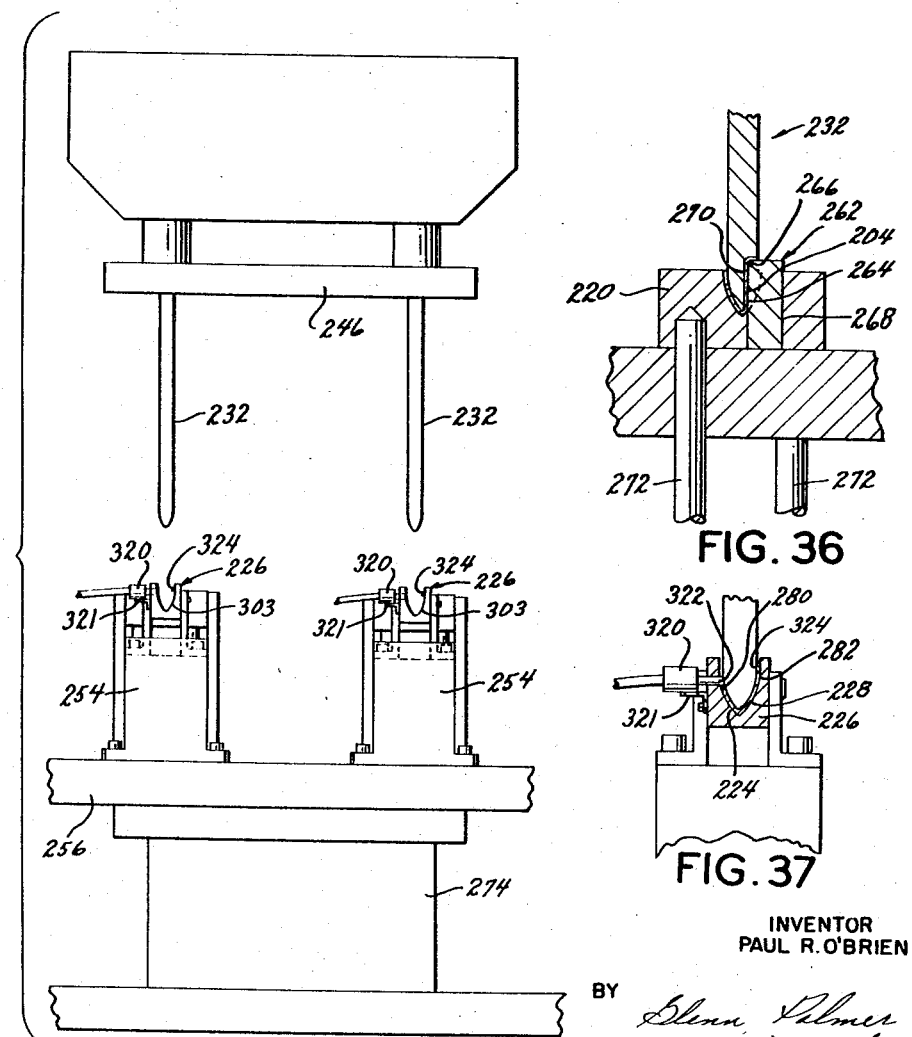
FIG. 36
FIG. 37
FIG. 39
INVENTOR
PAUL R. O'BRIEN
BY
HIS ATTORNEYS

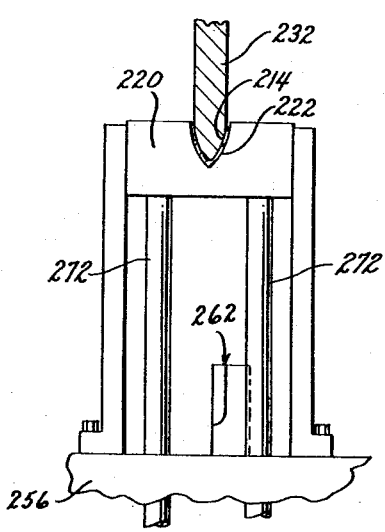
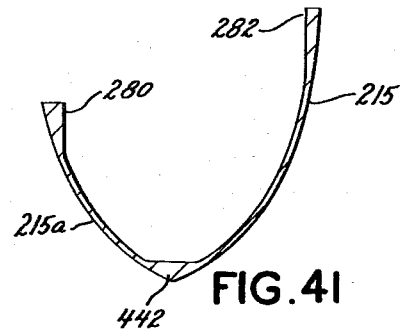
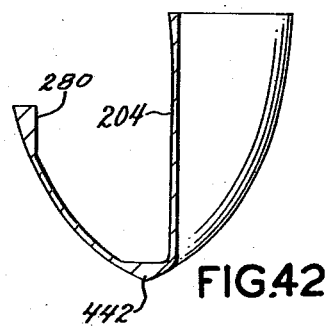
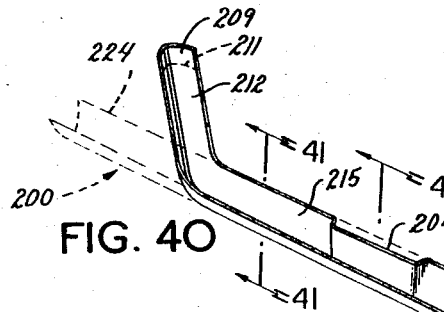
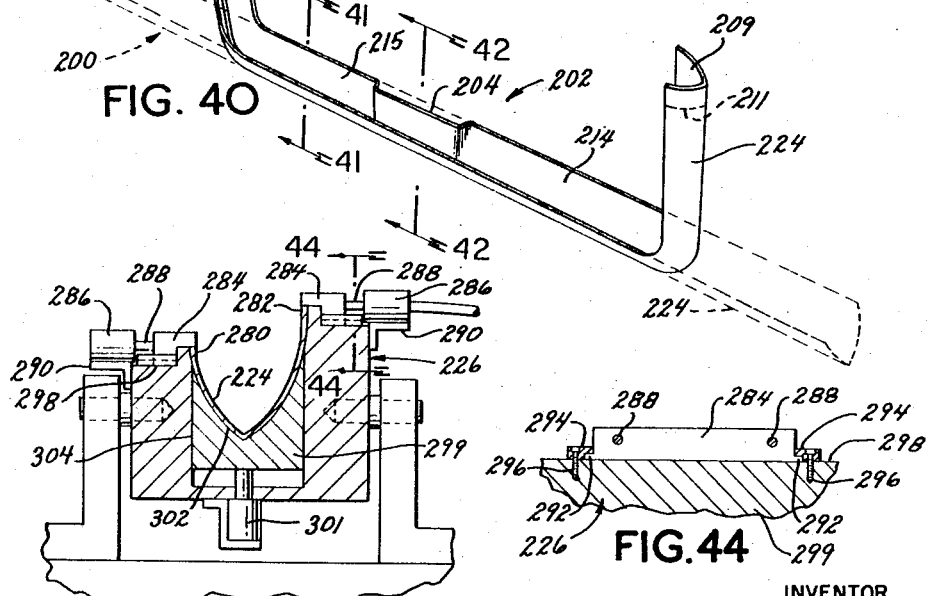

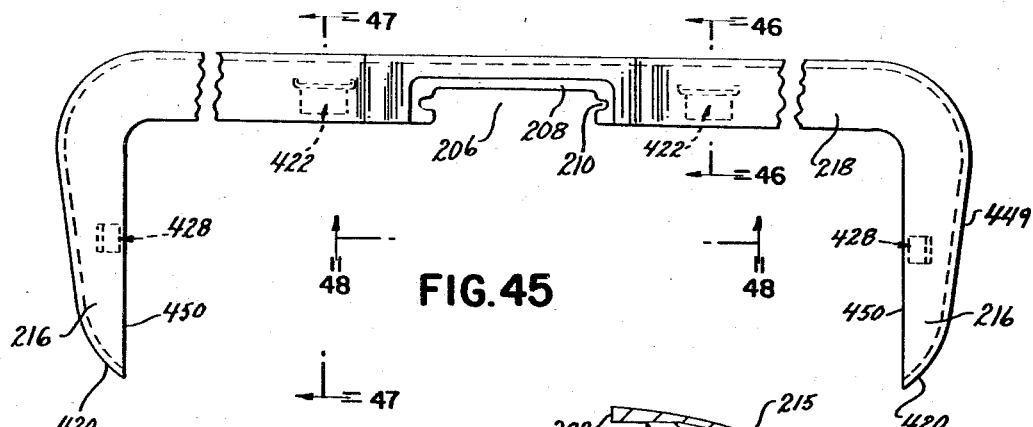
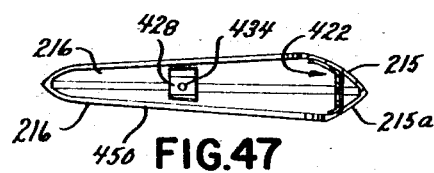
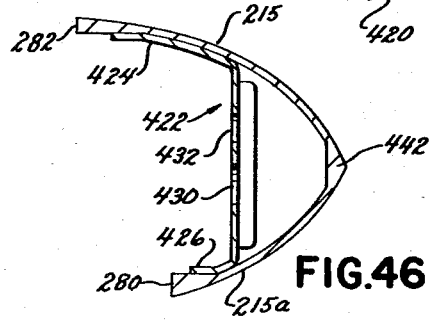
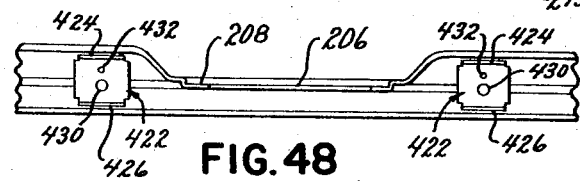
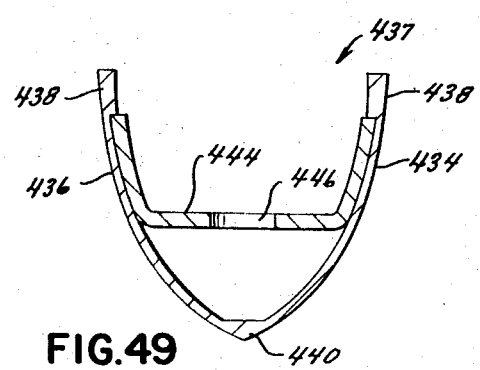
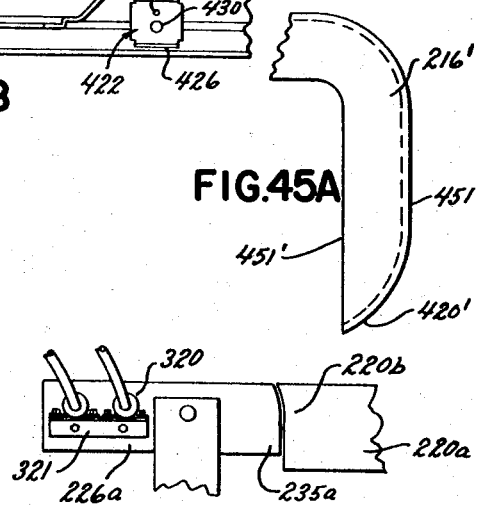

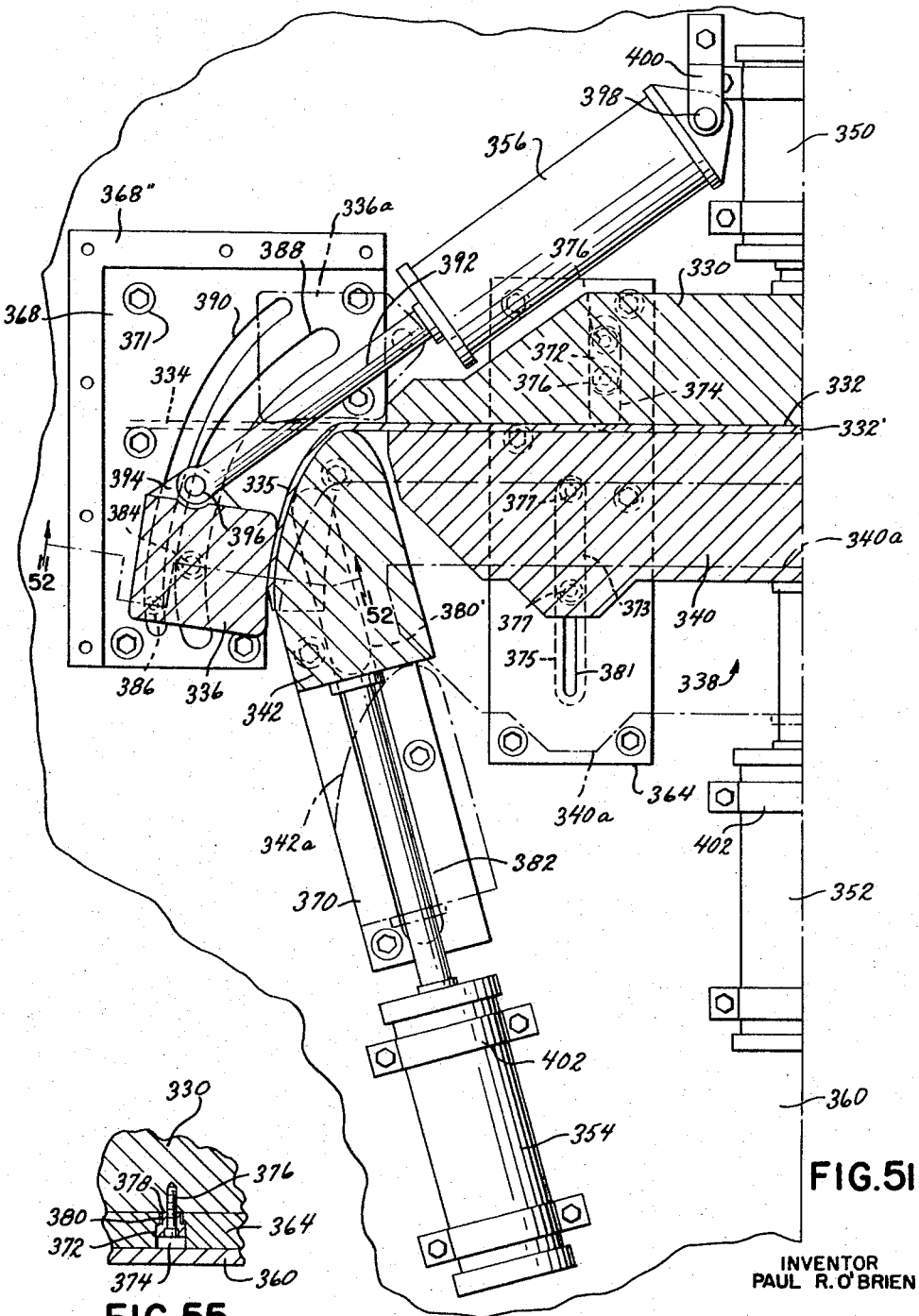

Nov. 28, 1967  P. R. O'BRIEN  3,355,266
BLANKS FOR VEHICLE BUMPERS
Original Filed Oct. 26, 1960  15 Sheets-Sheet 11

INVENTOR
PAUL R. O'BRIEN
BY Glenn, Palmer
& Matthews
HIS ATTORNEYS

Nov. 28, 1967  P. R. O'BRIEN  3,355,266
BLANKS FOR VEHICLE BUMPERS
Original Filed Oct. 26, 1960  15 Sheets-Sheet 12
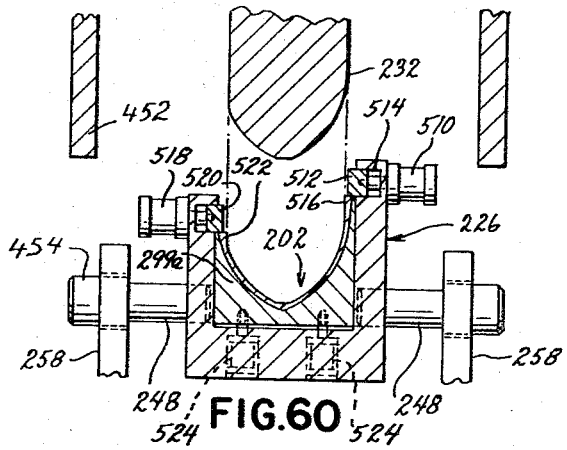
FIG.60
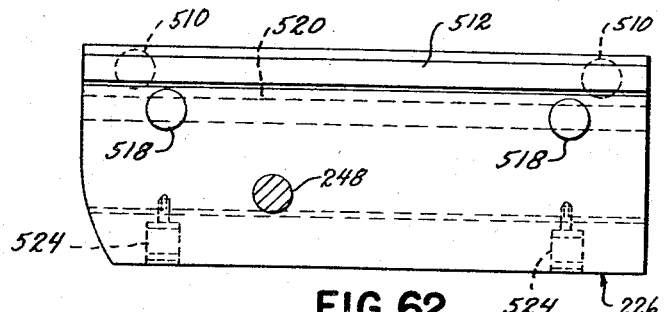
FIG.62
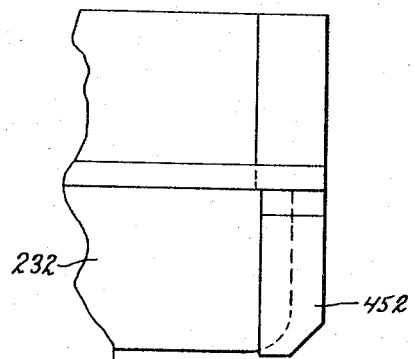
FIG.61
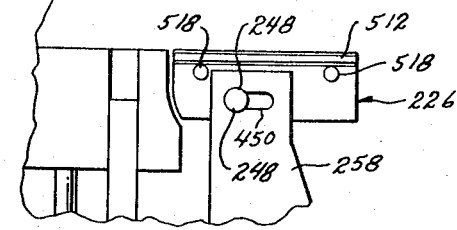
INVENTOR
PAUL R. O'BRIEN
BY
HIS ATTORNEYS INVENTOR.
PAUL R. O'BRIEN
BY Glenn, Palmer
& Matthews
ATTORNEYS Nov. 28, 1967   P. R. O'BRIEN   3,355,266
BLANKS FOR VEHICLE BUMPERS
Original Filed Oct. 26, 1960   15 Sheets-Sheet 14
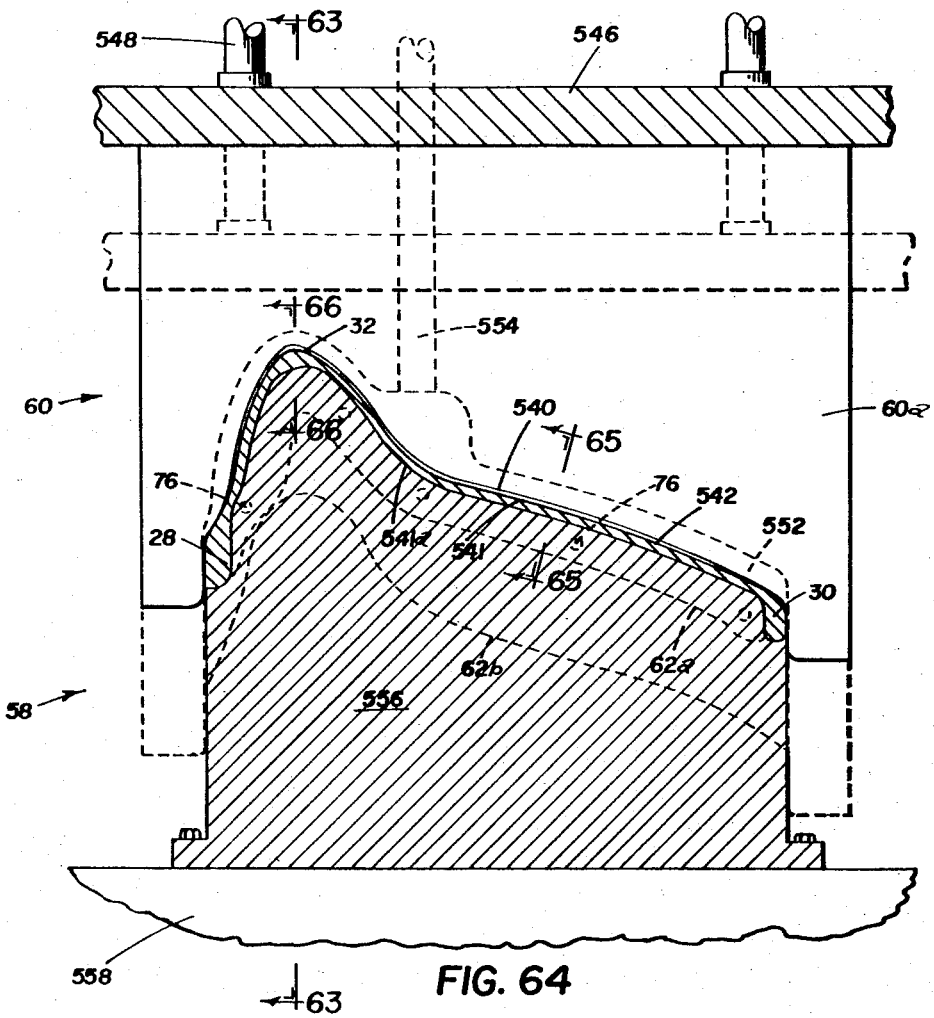
FIG. 64
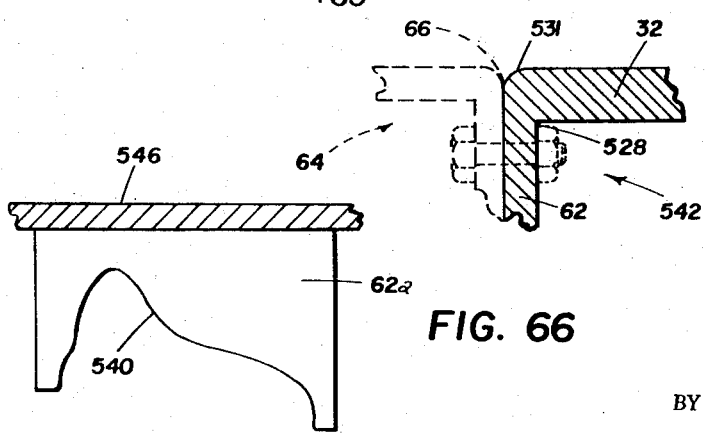
FIG. 68
FIG. 66
INVENTOR.
PAUL R. O'BRIEN
BY
ATTORNEYS Nov. 28, 1967  P. R. O'BRIEN  3,355,266
BLANKS FOR VEHICLE BUMPERS
Original Filed Oct. 26, 1960  15 Sheets-Sheet 15

INVENTOR.
PAUL R. O'BRIEN
BY Glenn, Palmer
& Matthews
HIS ATTORNEYS

United States Patent Office 3,355,266
Patented Nov. 28, 1967

3,355,266
BLANKS FOR VEHICLE BUMPERS
Paul R. O'Brien, Chesterfield County, Va., assignor to Reynolds Metals Company, Richmond, Va., a corporation of Delaware
Original application Oct. 26, 1960, Ser. No. 65,138, now Patent No. 3,212,941, dated Oct. 19, 1965. Divided and this application Aug. 26, 1965, Ser. No. 482,839
10 Claims. (Cl. 29—190)

This application is a division of applicant's copending application, Ser. No. 65,138, filed Oct. 26, 1960, now Patent No. 3,212,941, for Aluminum Article, Such as a Bumper and the Like, which copending application is, in turn, a continuation-in-part of applicant's application, Ser. No. 25,689, filed Apr. 25, 1960, now abandoned for Aluminum Article, Such as a Bumper and the Like.

This invention relates to the production of brilliant surface aluminum containing metallic articles, and more particularly to the production of bumpers for automotive vehicles, such as automobiles and the like, which bumpers are formed from aluminum containing metallic substances. The invention also relates to other articles, such as strips for dashboards, structural members of the automobile, frames, etc., which are used both for stiffness and structural characteristics as well as decorative trim.

Automotive vehicle bumpers have been made by forming sheet steel of relatively uniform thickness into the desired shape in various presses and the like. Thereafter the bumpers so formed have been chrome plated to the desired chrome thickness and brightness. These bumpers have undesirable disadvantages. For example, such bumpers do not have the necessary strength along the area where extra strength is needed. Also such steel bumpers are relatively heavy and have an undesirable weight effect at the ends of the car, and particularly when subjected to the salt splash from salted highways.

According to this invention, automobile bumpers and the like are made from aluminum containing metallic material in a manner so that such aluminum bumpers have from two to six times the impact and load capacities of steel bumpers. The cost ratio is favorable to the aluminum bumpers, and with proper product design may be as much as about a five to seven ratio. In addition the thickness of the material may be increased where most needed, such as at the upper and lower edges where tow chains may create a bending action, and also at the impact bead at the outermost zone of the bumper. Also the aluminum containing bumper will not corrode and will not lose its brightness in the manner of a steel bumper.

The article or bumper of this invention is made of an aluminum containing metallic substance such as an aluminum heat treatably alloy, preferably a magnesium alloy, which may be, for example, a wrought aluminum alloy of the series containing aluminum alloy 6463-T6 or a similar alloy.

The bumper of this invention overcomes many of the objectionable features of sheet steel bumpers which are now in use.

The thickness of the material is increased at the impact ridge where impacts are most likely and at the edges of the bumper. This produces a beam-like action which strongly resists bending during impact, towing, pushing, etc.

The bumper of this invention has approximately ½ the weight of a sheet steel bumper of comparable size and strength. The cost ratio is also very favorable. The tooling cost is approximately ½ that of tools for comparable steel bumpers. It does not corrode materially and does not lose its brightness.

The novel manufacture of this invention includes novel apparatus and methods for efficient production of the bumper.

The operation includes a combined formation and heat treatment that gives greater physical strength, improved properties and increased specularity or reflectivity.

Accordingly, it is an object of this invention to provide an improved bumper made of metallic substances which contain a large proportion of aluminum.

Another object is to provide improved apparatus for producing such a bumper.

Another object of this invention is to provide brilliant surface aluminum containing metallic articles, such as automotive vehicle bumpers and the like, which are made of aluminum containing metallic substances.

Another object of this invention is to provide aluminum containing bumpers in which the thickness of the material is increased where most needed.

Further objects are apparent from this description and from the accompanying drawings, in which:

FIGURE 9 is a diagrammatic representation of a die construction for a second forming operation.

FIGURE 10 is a diagrammatic representation of a portion of the blank after the second forming operation.

FIGURE 11 is a cross section along the line 11—11 of FIGURE 10.

FIGURE 12 is a diagrammatic representation of a die construction for a third forming operation.

FIGURE 13 is a diagrammatic representation of a portion of the blank after the third forming operation, and piercing operation.

FIGURE 14 is a diagrammatic representation of the quenching operation following the forming procedure.

FIGURE 15 is a diagrammatic representation of the trimming and piercing operations following the quenching operation.

FIGURE 16 is a diagrammatic representation of the precipitation heat treatment for artificial aging.

FIGURE 17 is a diagrammatic representation of the polishing and buffing operations following the aging operation.

FIGURE 18 is a diagrammatic representation of the bright dip operation following the polishing and buffing operation.

FIGURE 19 is a diagrammatic representation of the anodizing operation following the bright dip operation.

FIGURE 20 is a diagrammatic representation of the finished bumper part in readiness to be installed on the automobile.

FIGURE 21 is a diagrammatic representation of a portion of the article of FIGURES 1-20 in use on the automobile.

FIGURE 22 is a diagrammatic perspective view of another embodiment of a bumper according to this invention.

FIGURE 23 is a cross section of the extrusion for the bumper of FIGURE 22.

FIGURES 24 and 25 are cross sections of the blank taken along the lines 24—24 of FIGURE 28 and 25—25 of FIGURE 29 respectively.

FIGURE 26 is a view in perspective of the license plate area after the forming, trimming and piercing operations.

FIGURE 27 is a cross section along line 27—27 of FIGURE 26.

FIGURE 28 is a perspective view looking toward the top edge of the end of the bumper after the second draw operation prior to cupping the end.

FIGURE 29 is a perspective view looking toward the bottom edge of the bumper after cupping the ends but before trimming.

FIGURE 30 is a perspective view looking toward the top edge of the finished bumper.

FIGURE 31 is a chart indicating steps which may be performed for the production of the bumper.

Figure 32:
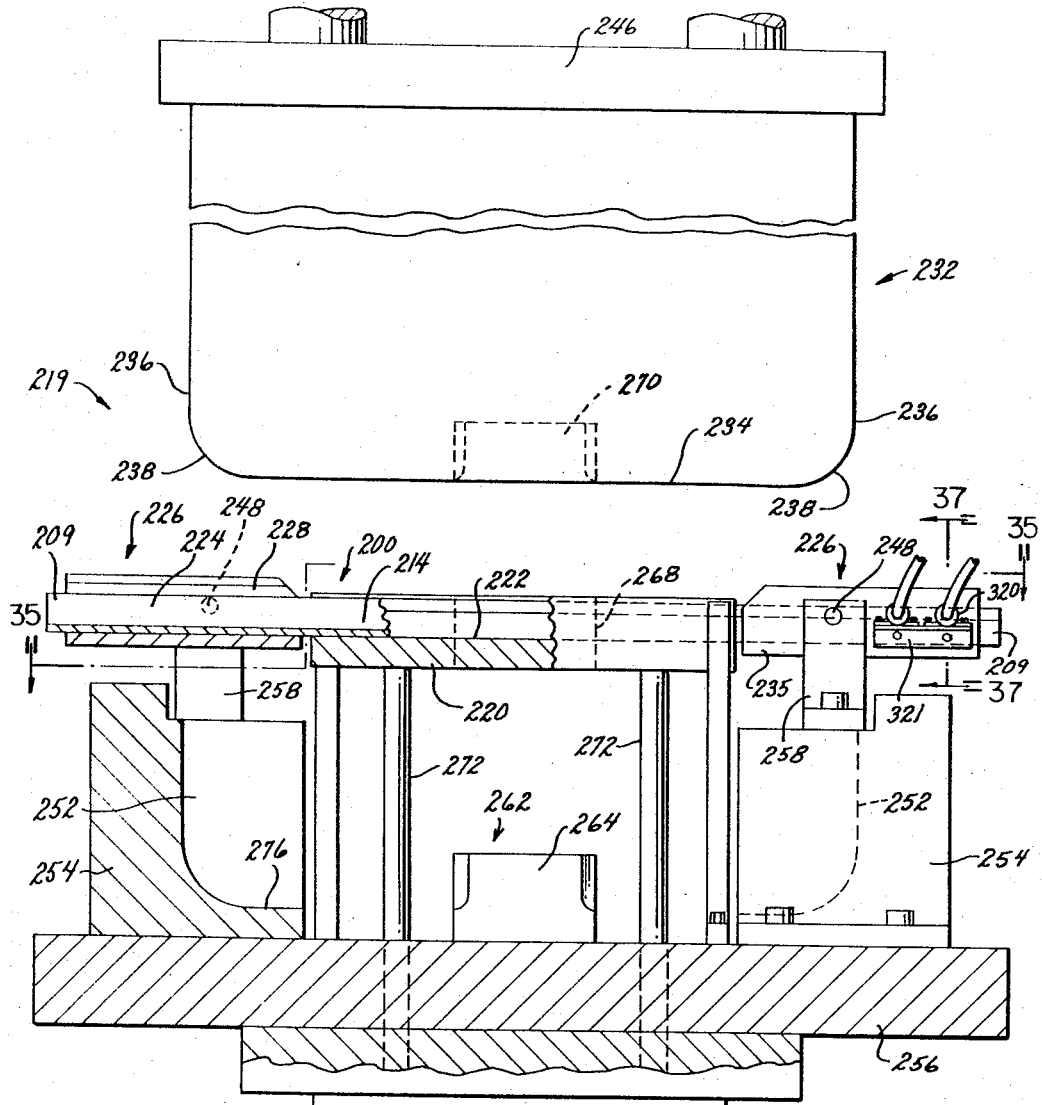

FIGURE 32 is a diagrammatic elevation, partly in cross section, of an apparatus for bending the ends of a bumper formation or blank, which blank is shown in initial position in the apparatus.

FIGURE 33 is a view of a portion of FIGURE 32 showing the parts during an early stage of the forming or bending stroke.

FIGURE 34 is a view of the part of FIGURE 33 at the end of the stroke.

FIGURE 34A is a cross section along the line 34A—34A of FIGURE 34.

FIGURE 35 is a horizontal cross section along the line 35—35 of FIGURE 32, with the blank removed.

FIGURE 36 is a cross section along line 36—36 of FIGURE 34.

FIGURE 37 is a cross section along the line 37—37 of FIGURE 32.

FIGURE 38 is a cross section along the line 38—38 of FIGURE 33.

FIGURE 39 is a diagrammatic elevation of the front of a press having a pair of duplicate bending apparatus of the character shown in FIGURES 32–38 inclusive.

FIGURE 40 is a perspective view which shows the bumper blank in dotted lines before it has been processed in the apparatus shown in FIGURES 32–39 and in full lines after it has been processed by such apparatus.

FIGURE 41 is a cross section along the line 41—41 of FIGURE 40.

FIGURE 42 is a cross section along the line 42—42 of FIGURE 40.

FIGURE 43 is a cross section similar to FIGURE 37 showing another embodiment of the gripping means for the end of the bumper blank in the rocker member.

FIGURE 44 is a cross section along line 44—44 of FIGURE 43.

FIGURE 45 is a plan view of a substantially completed bumper, with parts broken away.

FIGURE 45A is a modification applicable to both ends of the bumper of FIGURE 45.

FIGURE 46 is an enlarged cross section of the immediate structure along the line 46—46 of FIGURE 45.

FIGURE 47 is a cross section along the line 47—47 of FIGURE 45.

FIGURE 48 is an elevation of a portion of FIGURE 45 taken from the line 48—48 of FIGURE 45.

FIGURE 49 is a cross section of another embodiment of a bumper and attaching bracket.

FIGURE 50 is an elevation showing another embodiment of adjacent ends of a rocker member and the center pressure member.

FIGURE 51 is a diagrammatic horizontal cross section of one symmetrical half of another embodiment of this invention showing the initial position in dotted lines and a second position in full lines.

Figures 52, 54:
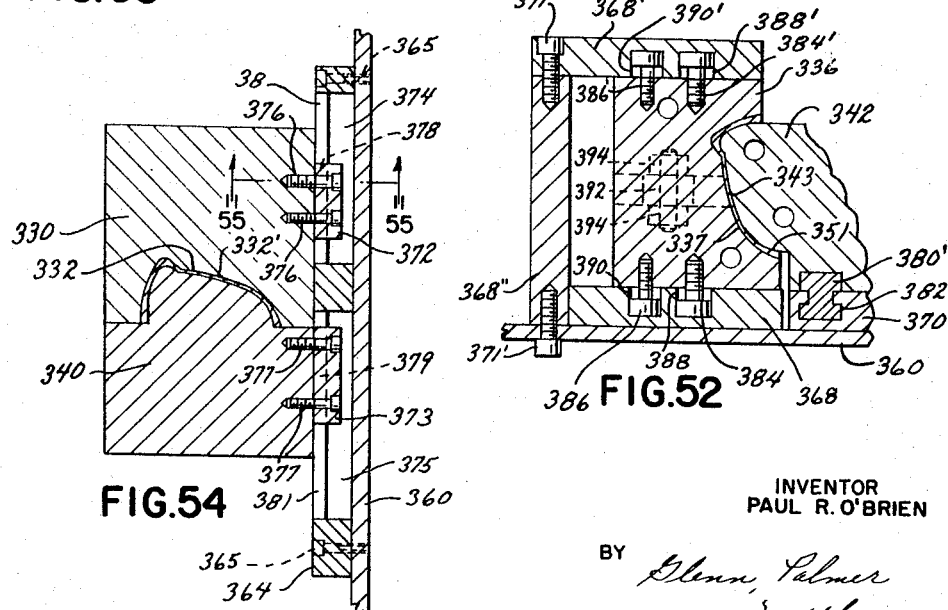

FIGURE 52 is a vertical cross section along the line 52—52 of FIGURE 51.

Figure 53:
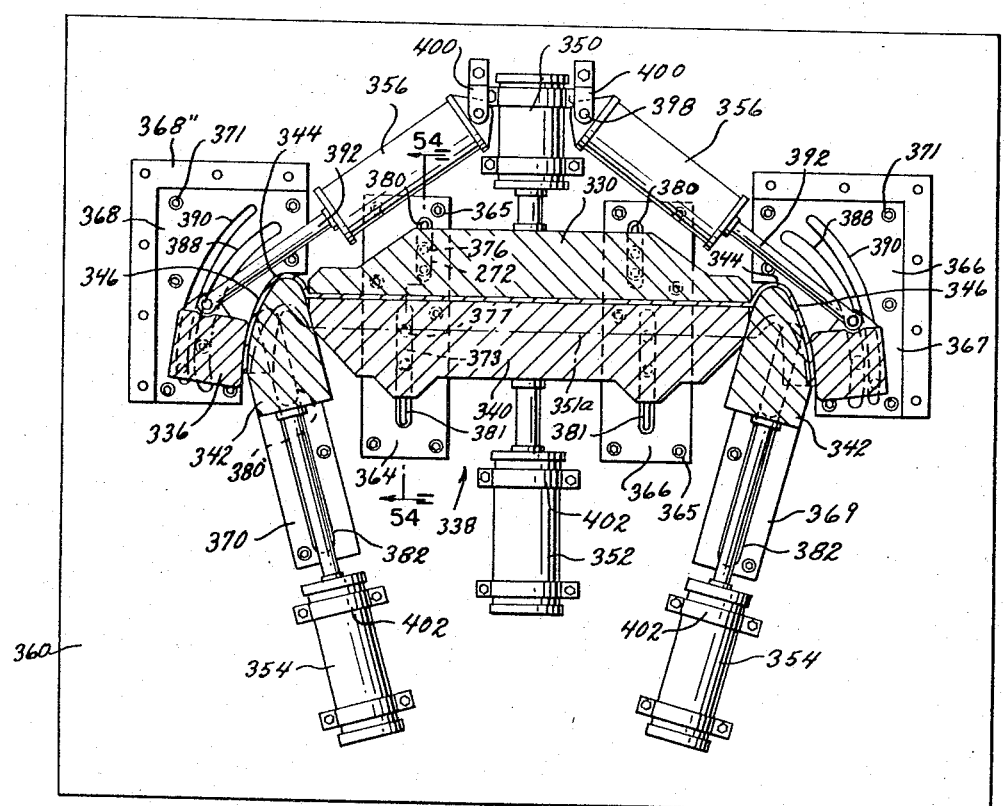

FIGURE 53 is a diagrammatic horizontal cross section, on reduced scale, showing a position following the full line position of FIGURE 51.

FIGURE 54 is a cross section along the line 54—54 of FIGURE 53, on enlarged scale.

FIGURE 55 is a cross section along the line 55—55 of FIGURE 54.

FIGURE 56 is a vertical view of another embodiment for the rocker members of FIGURE 43.

FIGURE 57 is a view of a portion of FIGURE 56 at a later stage of the strike.

FIGURE 58 is a transverse view of FIGURE 57 taken along the line 58—58 of FIGURE 56.

FIGURE 59 is a view of the bend of a bumper and indicating the advantages of the steps of FIGURES 56–58.

FIGURE 60 is a cross section of another embodiment of rocker member construction.

FIGURE 61 shows the rocker member of FIGURE 60 with the punch member and cam member.

FIGURE 62 is a side elevation of FIGURE 60.

Figure 63:
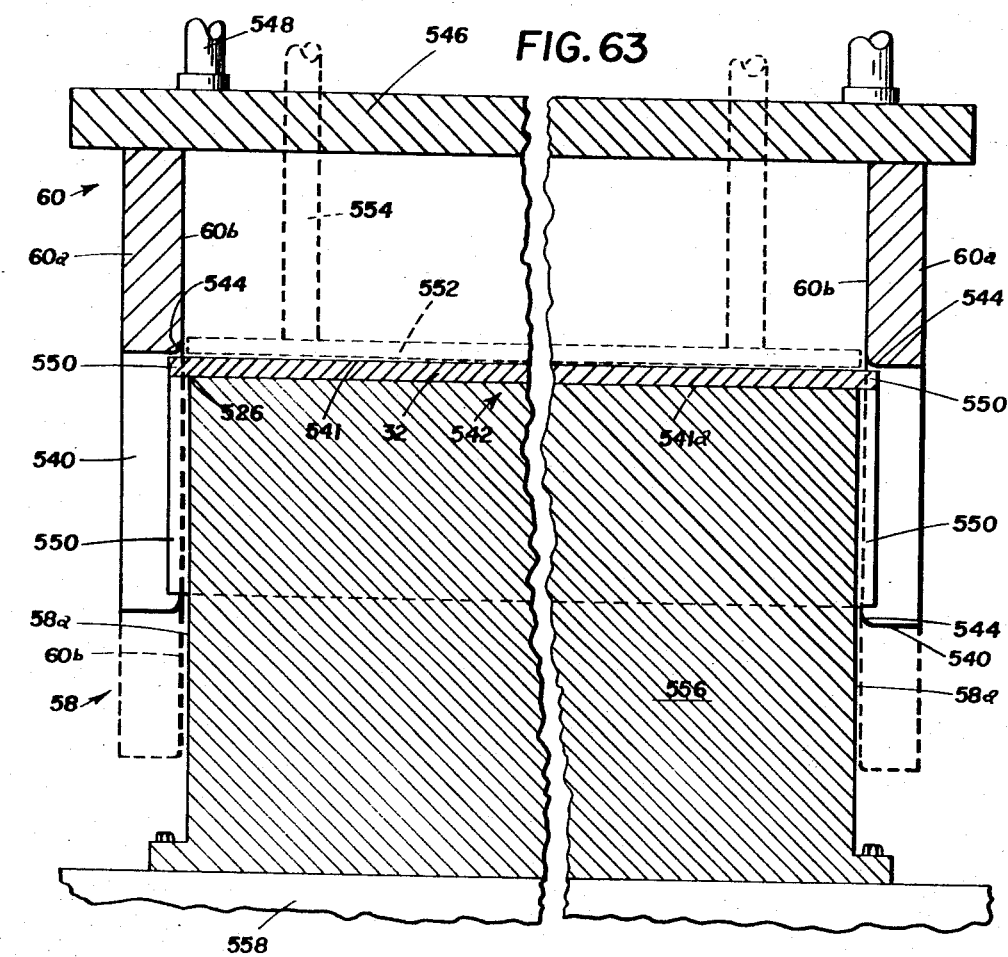

FIGURE 63 is a diagrammatic enlarged vertical cross section of the dies of FIGURE 12 taken along line 63—63 of FIGURE 64.

FIGURE 64 is a cross section transverse to FIGURE 63.

Figure 65:
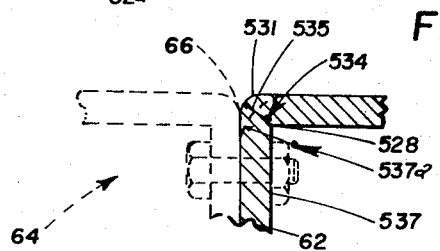

FIGURE 65 is an enlarged diagrammatic typical cross section along the end of the finished bumper construction, substantially along line 65—65 of FIGURE 64.

FIGURE 66 is an enlarged view similar to FIGURE 65 but taken along line 66—66 of FIGURE 64.

Figure 67:
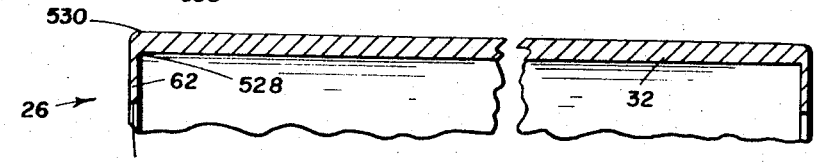

FIGURE 67 is a longitudinal cross section of part of the blank of FIGURE 63 after the strike and trimming operations and taken along the plane of FIGURE 63.

FIGURE 68 is a reduced view of the upper die of FIGURES 63 and 64.

Figures 69, 70, 71, 72:
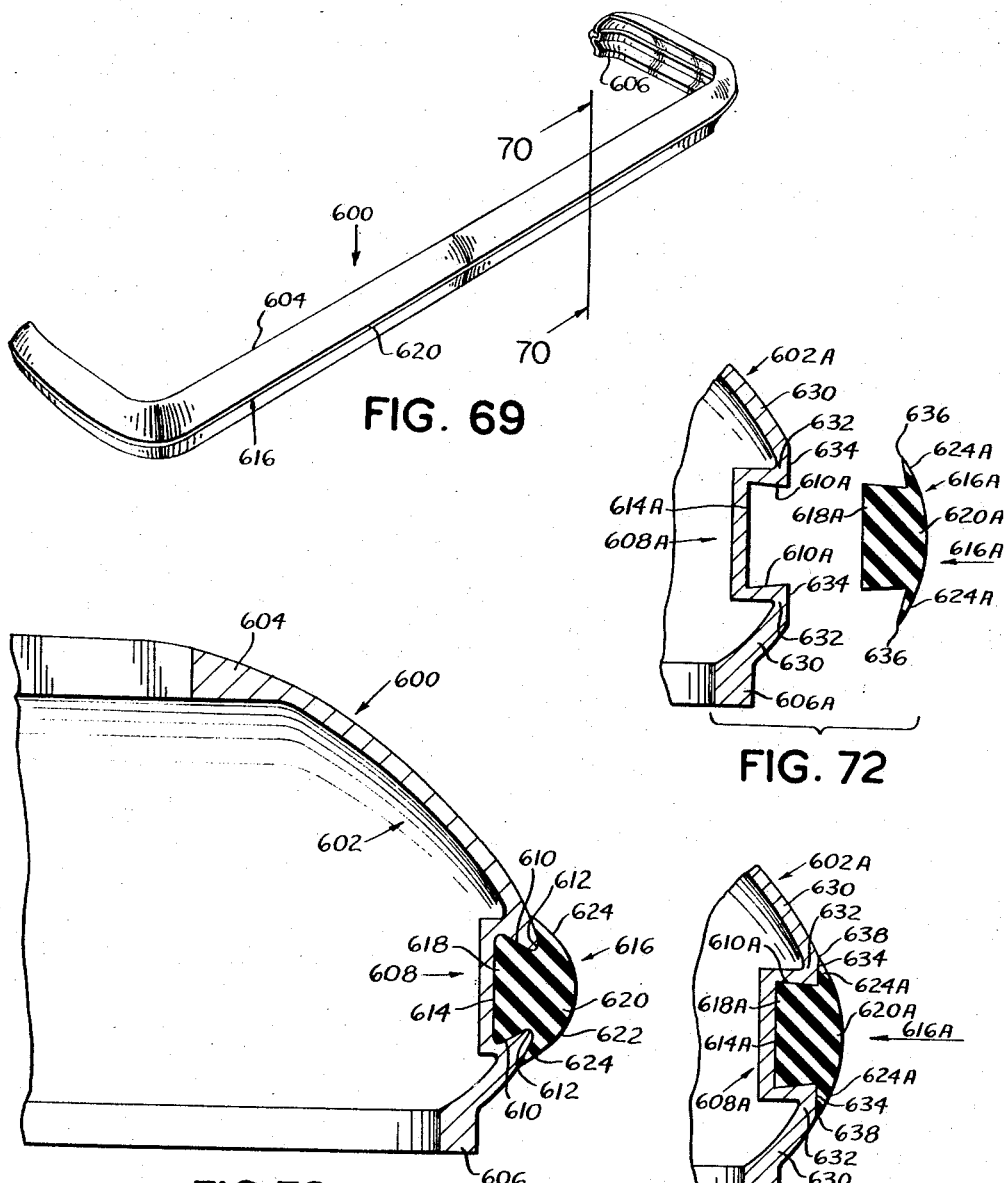

FIGURE 69 is a view in perspective of another embodiment of a bumper according to this invention.

FIGURE 70 is an enlarged cross-section taken along the line 70—70 of FIGURE 69.

FIGURE 61 is a cross-section of a portion of a bumper somewhat similar to the bumper of FIGURES 69 and 70 but showing another embodiment of the insert.

FIGURE 72 is a cross-section of the parts of FIGURE 71 before assembly.

Certain words indicating direction and the like, such as "bottom," "top," "above," "below," etc., are used for convenience in description, and are not intended to imply that the invention is limited to the specific directions so described.

According to this invention, a proper aluminum containing metallic substance, preferably in the alloy form, such as an alloy known as number 6463, is formed into a brilliant surface aluminum containing metallic article, such as an automotive vehicle bumper and the like by the operations which are outlined in FIGURE 31 as illustrative of the practice of the invention as follows:

(1) The alloy is cast at A into logs B such as from 6 inches to 14 inches in diameter D.C.

(2) The logs are homogenized at C such as in a 33 hour cycle of which 24 hours may be a temperature "soak" in an air atmosphere at a temperature in the order of 1100° to 1150° F. This step is important in removing irregular streaked colored surfaces known in the trade as "structural streaking." This is an important step in the process for obtaining maximum specularity. The homogenizing time cycle, including the "soaking" temperature, may vary from 18 to 48 hours depending upon the particular material being treated.

(3) The logs are cut at E to proper length to form billets F for use in proper extruding apparatus.

(4) The billets are heated to extruding temperature at G.

(5) The billets F are extruded at H in proper apparatus to form a strip I of the desired shape, which shape may be, for example, any of the shapes of the blanks for bumper formation herein disclosed.

(6) The strip I is then cut at J into blanks K of substantially the length of the article being produced, with sufficient additional material to provide for procedure losses.

(7) The blanks K are heated to a temperature in the order of 935° to 980° F. in furnace L. They are soaked in furnace L for a maximum period of time (such as five to fifteen minutes) in an atmosphere of air and ammonium fluoborate ($NH_4BE_4$) and the like. For example, one ounce of ammonium fluoborate to 48 cubic feet of furnace capacity may be introduced into the furnace L in sufficiently comminuted form to be taken up by the air which is forcibly circulated in the furnace L by a suitable fan or blower.

The ammonium fluorborate reacts with the aluminum in the blank K to form a preferred type of oxide which is believed to be a complex aluminum fluoborate coating.

The aluminum ammonium fluoroborate coating prevents attack of the surface by a gas such as hydrogen which would otherwise result in a non-uniform attack of the surface and, therefore, result in a blotchy appearance. However, with this complex coating, a uniform and brightening attack of the surface is later made by the chemical-brightening composition. This is particularly true of aluminum containing magnesium alloys.

This atmosphere is illustrative of any desired brilliant surface forming medium or hydrogen absorption resistance producing medium.

(8) Within 10 to 45 seconds time interval after the operation 7 above, the blank K is subjected to forming procedure which may include one or more forming procedures diagrammatically illustrated at M in FIGURE 31.

The illustration at M is emblematic of any of the various forming procedures herein disclosed, or similar forming procedures according to this invention.

(9) After the desired number of forming operations, the article or bumper is quickly quenched substantially to room temperature, such as in a violent air agitation or in a water quench, as diagrammatically indicated at N, FIGURE 31.

(10) The article or bumper is then trimmed and pierced at O, FIGURE 31, to the desired final shape in proper apparatus. For example, the area which receives the license plates in a bumper construction may be simultaneously pierced at a plurality of points such as shown in FIGURE 13 by the die member shown in FIGURE 15 which figures are merely illustrative of the trimming and piercing operations which are or may be performed on the article and in any of the embodiments herein disclosed. The brackets are attached at O′.

(11) The article may then be artifically aged at P, in FIGURE 31, such as by a precipitation heat treatment, as in a furnace at a temperature of 360° F. for four to six hours or at 375° F. for from two and one-half to three hours to produce the desired temper, such as a T6 temper. This treatment is also diagrammatically indicated in FIGURE 16.

(12) If desired, smoothing operations, such as suitable polishing and/or buffing operations, may be performed at Q, FIGURE 31, on the exterior surface of the article where desired, as also is diagrammatically indicated in FIGURE 17.

(13) If desired, the article may be chemically brightened at R, FIGURE 31, and as also diagrammatically indicated in FIGURE 18 in any well known chemical brightening solution. For example, one suitable commercially available chemical brightening solution contains about 81% phosphoric acid, 3% nitric acid, and the remainder water. The solution may be maintained at an operating temperature of about 185° F.

Thereafter, the article may be annodized at 8 in FIGURE 31 and as also diagrammatically indicated in FIGURE 19, in any well known anodizing solution, to produce an aluminum oxide film of from .00015 to .0003 inch in thickness.

Describing in more detail the operations of FIGURES 1 to 19, which relate to one embodiment of this invention, the specific article illustrated for the purpose of illustration is a part of the rear bumper of a 1959 Pontiac automobile, modified according to this invention. The extruding apparatus 22, FIGURE 1, or H in FIGURE 31, extrudes a relatively long strip 24 of FIGURE 2 or I of FIGURE 31, by well known process, which may include the operations 1 to 5 above and steps A–I FIGURE 31. The blank 26, FIGURE 2 or I FIGURE 31, may be cut to length at J, FIGURE 31, as above described for operation 6, or the blank may be produced after a light stretching operation.

Figure 3:
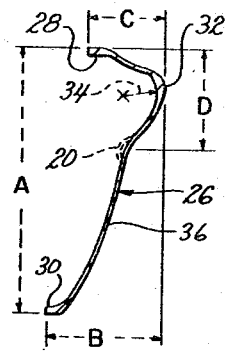
FIGURE 3 is an enlarged cross section along the line 3—3 of FIGURE 2.

The cross section of the strip 24, and/or blank 26 is indicated in FIGURE 3. The thickness of the material may be increased where most needed, such as at the edges 28 and 30 and at the outward impact curve 32. For example, the thickness at edge 28 may be .240 in vertical measurement. The thickness of edge 30 may be .260 inch in vertical measurement. The thickness of curve 32, at its thickest point, may be .281 inch in thickness, measured along the radial line 34, where such radial line 34 intersects at the thickest portion of the curved part 32. The typical thickness of the main portion of the wall may be .110 inch, for example, at a place such as 36 in FIGURE 3. By way of example, the dimension of A may be 10.532 inches. The dimension B may be 3.750 inches. The dimension C may be 3.188 inches. The dimension D may be 3.906 inches, and the other dimensions may be substantially in the general ratio indicated in FIGURE 3.

Figure 2:
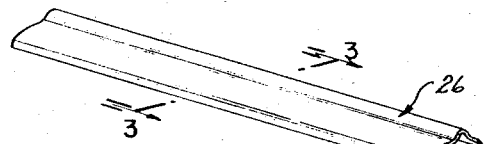
FIGURE 2 is a diagrammatic representation of a typical blank cut from the extrusion of FIGURE 1.
Figure 4:
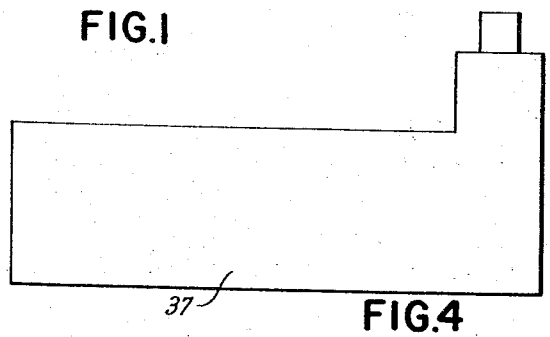
FIGURE 4 is a diagrammatic representation of an apparatus in which the brilliant surface enhancing medium may be applied.

The blank shown in FIGURES 2 and 3 may "soak" in the furnace 37, FIGURE 4, or L, in FIGURE 31, for a period of from five (5) to fifteen (15) minutes in an atmosphere of air into which ammonium fluoborate has been added. This substance may be introduced in solid or comminuted form, if desired, into the furnace 37, or to where such substance vaporizes and mixes with the circulated air in the furnace 37 or L to form a brilliant surface enhancing medium, or a hydrogen absorption resistance producing medium, which is particularly beneficial in enhancing the effectiveness of the chemical brightening and anodizing operations which are later performed on the article, and in preventing hydrogen absorption during the entire manufacturing operation which follows.

Figure 5:
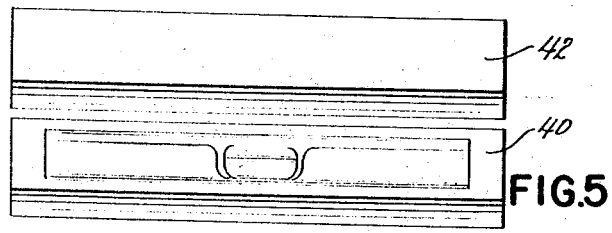
FIGURE 5 is a diagrammatic representation of die construction for the first forming operation.

A forming procedure is then performed on the blank within about 10 to 45 seconds after the soaking operation in the furnace 37. The following procedure may include one or more forming operations. For example, a first forming draw is performed while the blank is still within about from 900° to 950° F., as diagrammatically indicated in FIGURES 5 to 7, and possibly FIGURE 8. FIGURE 5 is a diagrammatic representation of any drawing die construction which will produce the preliminary license plate receiving indention 38, FIGURE 6, in blank. The diagrammatic illustration in FIGURE 5 is merely to indicate that a pair of relatively movable die members 40 and 42 may be operated by a suitable press, in a well known manner, to produce the indentation 38. The dies 40 and 42 preferably are heated to a temperature of 350° to 400° F.

A second forming operation may be performed while the blank is still at a temperature of from 850° to 900° F., as diagrammatically illustrated in FIGURES 9, 10 and 11. The die members diagrammatically indicated at 44 and 46 are relatively movable towards and away from each other by a suitable press as heretofore described in connection with FIGURE 5. It performs a second draw on the indentation 38 of FIGURES 6 and 7 so that the walls 48 are substantially perpendicular to the general longitudinal axis of the bumper and are bounded by the ridges 50 which are rigidifying and ornamental in nature. The dies, 44 and 46 preferably are also heated to a temperature of 350°–400° F. This second draw may substantially finish the indentation 38 to its desired shape so that it will be in readiness for the trimming and piercing operation which will be performed later. In addition, this second forming operation may alter the inner contour of the cross section throughout the length of the blank, for example, as indicated along the cross section 52, FIGURE 11, and may form bead 20, of FIGURE 3, on both sides of the license plate indentation 38. The license plate receiving wall 54 has now been formed substantially at right angles to the other wall 56.

Figure 8:
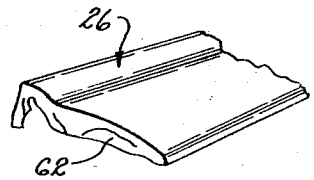
FIGURE 8 is a diagrammatic representation of the end of the blank after the first forming operation.
Figure 6:
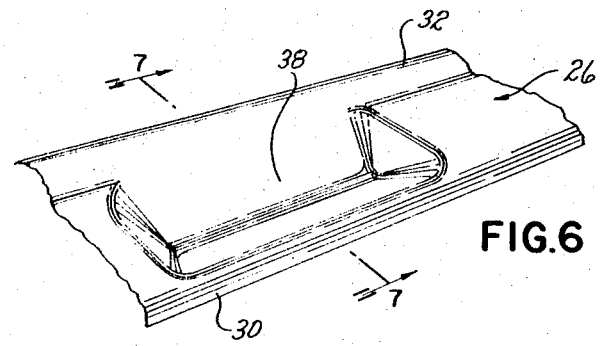
FIGURE 6 is a diagrammatic representation of a portion of the blank after the first forming operation.
Figure 7:
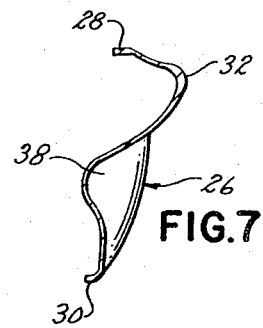
FIGURE 7 is a cross section along the line 7—7 of FIGURE 6.

If desired, a third forming operation may be performed by a pair of dies diagrammatically indicated at 58 and 60 in FIGURE 12 which bend the end portion of the blank at 62 in the direction of the spaced edges 28 and 30, as shown in FIGURE 8, if not previously formed, so that this part may be later trimmed and pierced. The end portion 62 later will cooperate with the additional portions 64 of the bumper construction on the car, as illustrated in FIGURE 21, to form a neat seam 66 and a strong junction at this point as will become apparent to those skilled in the art. This third forming operation may be performed while the blank is still at a temperature of from about 800° F. to 850° F. The dies 58 and 60 preferably are heated to a temperature of 350°–400° F.

Thereafter, the blank, while still in a heated condition, and as soon as possible after the last forming operation, may be quenched as diagrammatically indicated by FIGURE 14, and N of FIGURE 31, in a water bath 67, or in a violent air agitation apparatus or water spray, not shown.

After the quenching operation, the blank may be trimmed and pierced where required, as diagrammatically indicated in FIGURES 13 and 15 to produce piercings 70, 72, 74, 76 and any other desired trimming or piercing operations which may be necessary.

After the piercing and trimming operation, the blank may be artificially aged such as by a precipitation heat treatment to produce the desired temper, such as a T6 temper. This may be done in any well known manner, as, for example, in a furnace shown in FIGURE 16, or at P, FIGURE 31, wherein the air atmosphere is maintained at a temperature of from 360° F. to 375° F., as previously described. This artificial age treatment may be at the temperatures and for the periods of time heretofore given.

Thereafter the exterior surfaces of the blank or bumper may undergo a smoothing treatment such as a polishing and buffing treatment by any suitable apparatus, FIGURE 17 and Q of FIGURE 31, of which FIGURE 17 is merely a diagrammatic representation.

Thereafter the article may be chemically brightened, for example, in the tank 82, FIGURE 18 or R, FIGURE 31, in any desired commercial chemical brightening solution.

Thereafter the article may be anodized, for example, as indicated at 8, FIGURE 31, or in the tank construction 84 of FIGURE 19 to which the electrical leads 86 and 88 from the current source 90 may be connected respectively to the cathode which may be the tank wall, if desired, and to the anode, which may be the bumper, to produce an oxide film of the thickness heretofore disclosed.

The finished article is then in the form as shown in FIGURE 20 in readiness to be installed on an automobile to cooperate with the other part 64 of the bumper, as shown in FIGURE 21, to which it is attached by bolts passing through bolt holes 76, FIGURE 20 with the channel open portion formed by the edges 28 and 30 of the bumper directed toward the vehicle and the channel bottom 26 directed away from the vehicle.

To illustrate the application of this invention to another type of bumper, reference is now made to FIGURES 22 to 30.

FIGURES 22–30 show another embodiment of this invention as applied to another type of bumper, such as the rear bumper of the Ford 1959 automobile, modified according to this invention.

FIGURE 22 illustrates the finished bumper diagrammatically in use on the automobile. Some of the differences of this bumper, as compared to the Pontiac automobile bumper of FIGURES 1–21, are that the upper edge of this bumper is curved downwardly at 100 to accommodate the lights 102, and that the ends 104 are integral and are curved around the rear corner of the car at 106, so the ends 104 are forwardly directed along the side of the car. The edges 108 of these ends 104 are inwardly cupped, so they do not present an exposed forward sharp edge.

Figure 1:
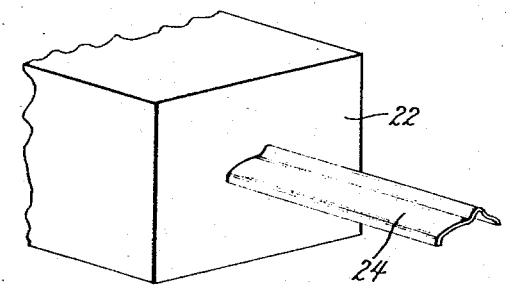
FIGURE 1 is a diagrammatic representation of a typical extrusion operation for this invention.

The extrusion may be similar to that of FIGURES 1 and 2, but may have a cross section as shown in FIGURE 23, where the edges are thicker at 110 and 111, and the part most likely to be bumped is thicker at 114. In general, the thicknesses given in connection with FIGURE 3 may be approximately the same in FIGURE 23, but the overall dimensions A to D may be varied to fit the particular automobile to which the bumper is to be applied, such as the 1959 Ford automobile.

The extrusion may be cut to length similarly to FIGURE 2 and the blank thus formed may be heated to the same temperature and may be "soaked" in a furnace, such as in FIGURES 4 or 31, in the same air and ammonium fluoborate medium and for the same length of time.

Thereafter the blank may have a forming procedure which may include one or more drawing operations, similar to those described in connection with FIGURES 5–11 to form the license plate receiving area, as shown in FIGURES 26 and 27 with the license plate area 115 being shown in trimmed condition in FIGURE 26.

The light receiving downward curve 100 of FIGURES 22 and 28 may be produced by a drawing operation which produces the curve as shown at 100 in FIGURE 28 and which may leave the excess material 116 to be trimmed.

The ends of the bumper blank are first bent around by a suitable forming operation, as indicated at 118, FIGURE 28, and are then cupped inwardly as at 120, FIGURE 29, where the ragged edges 112 may later be trimmed.

All of these forming operations are performed within about 10–45 seconds of time after the treatment in the furnaces of FIGURES 4 or 31, while the blank is still at a temperature of about from 950° to 800° F.

Thereafter the formed blank may be quenched to room temperature in a violent air agitation or in a water dip or spray quench as diagrammatically illustrated in FIGURES 14 and 31.

Trimming and piercing may then be performed with dies of proper shape, such as diagrammatically illustrated in FIGURE 15, or at O in FIGURE 31, but shaped to produce the proper trimming and piercing operations required for the particular bumper involved, such as the rear bumper of the 1959 Ford.

Artificial aging, such as precipitation heat treatment, at the temperatures and lengths of time previously given, may then be performed in a furnace, for example, as diagrammatically illustrated in FIGURES 16 or 31. Polishing and buffing, as diagrammatically illustrated in FIGURES 17 or 31, may be applied to the desired areas by proper polishing and buffing tools suitable for those areas. Chemical brightening and anodizing, as in FIGURES 18, 19 and 31 may then be performed to produce the finished bumper of FIGURES 21 and 30.

The bumper may be applied to the car by proper bolts through openings 123.

FIGURES 32 to 50 inclusive illustrate another embodiment of this invention which is exemplified, for example, in the 1959 Buick rear bumper, modified according to this invention, and which is used to illustrate features of this embodiment.

FIGURES 40-42 and 45-48 show the modified 1959 Buick rear bumper in various stages of production.

FIGURES 32-39, 43 and 44, show an apparatus and method for bending a straight blank 200, such as shown in dotted lines in FIGURE 40 into the shape shown in full lines at 202 in FIGURE 40.

The straight, dotted line, blank 200 of FIGURE 40 previously has been cast, extruded, cut, heated, and soaked in an atmosphere of air and $NH_4$ or the like, in a manner similar to the steps described in connection with FIGURES 1-30 or according to steps A-L, inclusive of FIGURE 31. The metallic material may be of the character herein elsewhere specified, and for example may be an aluminum alloy of the character known as the 6364 series.

The blank 200 of FIGURE 40 preferably is substantially within a temperature range in the order of from 935–980° F. when it leaves furnace L of FIGURE 31 and is introduced into the apparatus of FIGURES 32-39, 43 and 44. It is formed and bent into the shape shown in full lines 202, FIGURE 40, within about 10 to 45 seconds. The formed or bent blank 202 is then immediately quenched substantially to room temperature in a violently circulating air quench or a water quench, as diagrammatically illustrated at N in FIGURE 31. Thereafter suitable steps are performed on the quenched blank 202, such as indicated at O-S in FIGURE 31 to finish the blank 202 into a substantially completed bumper.

An advanced stage in the completion of the bumper is shown in FIGURES 45-48, and a cross section of another embodiment is shown in FIGURE 49.

The general cross section of the blank 200 and 202 is substantially as shown in FIGURE 41. The blank may be channel shaped with two longitudinal, spaced edges 280 and 282 and a longitudinal channel bottom 442 and with extra thickness in one or more bend resisting zones such as at edges 280 and 282 and at channel bottom 442. The edges 280 and 282 are to be directed toward the vehicle and the bottom 442 is to be directed away from the vehicle when the bumper which is made from the blank is attached to the vehicle. An indented portion 204 of FIGURES 40 and 42 is also formed in the blank 202 while in the apparatus of FIGURES 32-39, 43 and 44. This indented portion 204 is later finished into a tail light window 206 which is shown in FIGURES 45 and 48. A suitable transparent plate, not shown, is secured in the window 206, FIGURES 45-48, on the flanges 208 by suitable bolts, not shown, which pass perpendicularly through the notches 210 in the window 206.

The original straight blank 200 and the bent blank 202 of FIGURE 40 has excess material 209 at its ends, which later is removed approximately at 211 during the steps indicated at O-S, FIGURE 31, and the remaining portions 212 of the bent ends, and the central straight portions 214 of the bent blank 202, FIGURE 40, are finished into the shaped ends 216, central portion 218, and window 206 of FIGURES 45-48.

Reference now is made to FIGURES 32-39, 43 and 44, which show one embodiment of the apparatus and method for bending the straight blank 200 into the bent blank 202 of FIGURE 40.

The apparatus 219, FIGURE 32, for bending the blank 200 of FIGURES 32 and 40 into the bent blank 202 of FIGURES 34 and 40, and for practicing a corresponding method for forming a bumper, may include a center pressing member 220 having a center pressing member groove 222 of FIGURES 32, 35 and 38 to receive, in initial position, the substantially straight, groove shaped, bumper blank 200 of FIGURE 40, and which has the general cross section shown in FIGURE 41. The bumper blank 200 is placed in the groove 222 with its ends 224 extending beyond the pressing member 220. A pair of rocker members 226 are located respectively at each end of the pressing member 220, and have a rocker member groove 228 of FIGURES 32 and 37 which are aligned in initial position, with the pressing member groove 222 to receive the ends 224 of the bumper blank 200.

If desired, the apparatus shown in FIGURE 32 may be one of a pair of substantially identical apparatuses shown in FIGURE 39.

A punch member 232 has a central ridge member 234 relatively movable into the pressing member groove 222 to hold the bumper blank 200 in the pressing member groove 222. The punch member 232 also has a pair of punch side ridge members 236 respectively at each end of the central ridge member 234 and at an angle thereto, such as a right angle, with a curved portion 238 joining the end ridge members 236 to the central ridge member 234.

Means are provided, and are shown in FIGURES 33, 34 and 40, to cause relative movement between the center pressing memebr 220 and the rocker members 226 to bend the bumper blank ends 224 at an angle to the central portion 214 of the bumper blank, with the ends 224 being joined by a curved portion 240. The punch holder 246 carries the punch 232 and moves it into contact with the center pressing member 220 while the punch end ridge members 236 contact the inside ends 235, FIGURE 32 of the rocker members 226 to cause them to turn about the fulcrums 248 from their initial aligned or level positions, which are shown in FIGURE 32, to a substantially perpendicular position with the ends 224 as shown in FIGURE 34. This bending operation is illustrated also in FIGURE 40, with the straight position in dotted lines and the bent position in full lines.

The pressing operation is such that the punch 232 moves down until the lower, central ridge member 234, FIGURE 38, is snugly within the groove 214 of the bumper blank 200 which, in turn, is within the groove 222 of the center presure member 220. The curved punch portions 238 at the ends of the central ridge member 234 extend sufficiently far initially to extend into the ends 235 of the rocker members 226 and into contact with the groove 214 of the bumper blank 200. At this time the bumper blank 200 is still in a relatively straight condition. However, with a further downward movement of the punch 232, FIGURE 33, the rocker members 226 start to turn about the fulcrums 248, so that gradually the curved portion 238 and the end ridge member construction 236 finally bring the rocker members 226 into vertical position, FIGURE 34, to bend the straight blank 224 of FIGURE 32 into the bent blank 224 of FIGURE 34, substantially at right angles to the straight central portion 214. The results of this motion is shown in FIGURE 40 in which the dotted line blank straight ends 224 are bent into full line ends 212.

The downward movement of the punch 232, FIGURE 34, continues until the end ridge members 236 enter the re-strike grooves 252 in the restrike dies 254. The re-strike dies 254 are stationarily held or mounted on the stationary die shoe 256. The re-strike grooves 252 smooth out any corrugations that might be formed at the bends 240, FIGURES 40 and 34.

The fulcrums, or pivot pins 248, may be mounted on pedestals 258, which, in turn, may be mounted on the re-strike die 254 to hold the fulcrums 248 in stationary position.

Means are provided to strike a license plate formation 204, FIGURE 40, in the bumper blank 202. To this end, a stationary license plate die 262 in FIGURES 32-36 is mounted on the die shoe 256. The license plate die 262 has a flat face 264, with a curved upper end 266 in FIGURE 36, to flatten the larger wing 215 in FIGURE 41 of the blank 202 into a license plate receptacle 204, of FIGURE 40. The smaller wing 215a remains substantially unbent. The license plate die 262 is encompassed in the opening 268 of FIGURE 35 in the center pressing member 220 when the member 220 nears its lowest point of travel. The punch 232 has an indentation 270, FIG- URES 32 and 36, formed therein to receive the flattened portion 204, FIGURE 42, of the bumper blank 202.

The center pressing member 220 is supported by a plurality of pins 272 which extend down through the die shoe 256, FIGURE 32, and are supported by an air cushion 274 which maintains a yieldable pressure against the downward movement of the punch 232 firmly to hold the bumper blank 202 within the groove 222 of the pressing member 220 as shown in FIGURE 32. The air cushion 274 allows the pressing member 220 to descend to the position shown in FIGURE 34 where the bottom of the groove 222 is substantially aligned with the bottom 276 of the re-strike groove 252 to smooth cut the wrinkles which tend to be formed at 240 between the straight portion 214 and the bent ends 224 of the bumper blank 202 as shown in FIGURES 34 and 40.

It may be desirable at times, due to equipment limitations, to form the ends 212 of the bumper with the rocker members 226 and then to transfer the product immediately to a re-strike die to reform the ends 224 and to form the license plate area 204 of FIGURE 40.

Means are provided in the rocker member 226, FIGURES 43 and 44, to hold an grip the edges 280 and 282 of the bumper blank 202 from turning during the bending operation, and to exert a pulling action on the ends of the bumper blank. Such means may take the form of flanges 284 which may be moved to the position shown in FIGURE 43 from a retracted position by means of the cylinders 286 which have connecting rods 288 attached to the flanges 284. The air cylinders 286 are mounted on platforms 290 which are secured to the sides of the rocker members 226 by bolts or welds, not shown. The flanges 284, in turn, have side flanges 292 which slide under the angle members 294 which are bolted at 296 to a top portion 298 of the rocker members 226.

Similar flanges 284, cylinders 286, connecting rods 288, etc., are provided for both edges 280 and 282 on both sides 215 and 215a of rocker members 226 as shown in FIGURES 41 and 43.

A movable plunger 299 may be moved upwardly by the plunger and cylinder formation 301, FIGURE 43, to push the edges 280 and 282 of the ends 224 up against the flanges 284 to secure and hold the bumper ends 224 tightly. This prevents turning of the blank and produces a pull on the ends of the blank.

The unbent ends 224, FIGURES 32 and 40 of the bumper blank 200 and the bent ends 212, are held within the groove 302, which is formed in the member 299 and which is slidably in the generally rectangular channel 302 in the rocker members 226. The slidable member 299 is pushed upward by the air cylinder construction 301 after the flanges 284 have been moved over the edges 280 and 282 of the bumper blank.

If desired, the lower edges of the flanges 284 may be serrated (not shown) to produce a firm gripping action on the edges 280 and 282 of the bumper blank, to exert the desired tension on the ends 224 as they are being bent. This reduces or inhibits any corrugation formation at the bend 240 during the bending operation.

One form of means for gripping the ends 224 of the bumper blank 200 may be provided, as shown in FIGURES 32 to 39. Plunger and cylinder constructions 320 supported on rocker members 226 by brackets 321 move pins 322 into the bumper receiving grooves 303 (FIGURE 39) of the rocker members 226. Stationary bars 324 are provided on the sides of the grooves 303 which are opposite to the plungers 322 and which bars 324 are secured to the walls of members 226. The bumper blank 224 is placed in the grooves 303, first with the long edges 282 under the bar 324. Then the edge 280 is twisted down by the operators standing at each end of the bumper blank 224. Thereafter the plunger pins 322 are pushed in by the plunger or cylinder construcitons 320. The surface of the groove 303 may be serrated to produce a gripping action. Likewise, the surfaces of the grooves 302 of FIGURE 43 may be serrated to produce a gripping action.

Movable plunger 299 of FIGURES 43 and 44 with its operating parts may be substituted in the construction shown in FIGURES 37 and 39, if desired.

Heating means may be provided for any of the members of the bending apparatus, such as the punch 232. Such heating means may take the form of electrical resistance heaters which may be of the metallic sheath type in which helical resistance heaters are embedded in insulating powder such as $M_2O$, and which heaters are well known construction.

After the blank 202 has been bent and formed as indicated in full lines in FIGURE 40, the blank is quenched in violent air circulation or in a water quench as diagrammatically indicated at N in FIGURE 31. Thereafter the steps diagrammatically indicated at O, P, Q, R and S in FIGURE 31 may be applied to the blank 202 of FIGURE 40 to produce the bumper shown in FIGURES 45 to 48 inclusive.

For example, the indented portion 204 of the blank 202 of FIGURE 40 may be trimmed and pierced to form the tail light window 206 of FIGURES 45–48 as elsewhere described. The ends 212 of FIGURE 40 are cut to length at 211 and are otherwise trimmed and shaped in apparatus similar to that used for shaping steel bumpers to produce the tapered ends 216 and the rounded ends 420, of FIGURES 45–48. Brackets 422 may be welded at the legs 424 and 426 in FIGURE 46 to the sides of 215 and 215a of the bumper blank. The brackets 428 may likewise be secured to the ends 216, FIGURE 45, by brazing in a manner similar to that of brackets 422. The brackets 422 may be provided with openings 430 and 432 in FIGURE 48 for attaching the bumper to the automobile. The brackets 428 may be provided with openings 434 likewise to attach the bumper to the automobile. These openings 430, 432 and 434 may be used to receive bolts or screws for this purpose.

Thereafter the bumper construtcion may be artificially aged at P, FIGURE 31, as elsewhere herein specified, and may then be polished and buffed, bright dipped, and anodized, at Q, R and S in FIGURE 31, also as elsewhere specified.

FIGURE 49 shows another embodiment of a bumper blank which may be prepared and bent in a manner similar to that elsewhere described in connection with FIGURES 32 to 40 inclusive. This embodiment differs in that the sides 434 and 436 of the bumper construction 437 are of equal length, and are provided with substantially identical enlargements 438. The ridge 440 may be made thicker than the general cross section of the blank in a manner similar to the ridge 442 shown in FIGURES 41, 42 and 46. These enlarged ridges 440 and 442 cooperate with the enlargements 280, 282 and 438 to produce a beam-like construction which resists bending in the same manner that an I beam or the like resists bending.

Brackets 444 may be snapped into the bumper blank 437 of FIGURE 49 and hooked within the enlargement 438. If desired, the brackets may also be welded or attached with a high strength metal bending agent, solder, etc. Such brackets 444 may also each be provided with one or more openings 446 for receiving bolts or screws for attaching the bumper to the automobile. Such brackets 444 may be placed at any desired places, such as those corresponding to the brackets shown in FIGURE 45.

The finishing of the end 216, in FIGURES 45 to 48 is accomplished, in general, by cutting the edges 215 and 215a along the line 450, so that the depth of the bumper blank gradually decreases, as indicated in FIGURE 45. The ends 420 are then bent or cupped inward to meet the cut 450. Since a machine of this character is well known, in general, the same is not further disclosed herein.

Alternatively, the taper of legs 216 of FIGURE 45 may be omitted, and the legs 216′ of FIGURE 45A may be untapered, as shown at 451. The edges 451′ are straight because the inner edges 451 are not cut as was the case in FIGURE 45. The outer edges 451, FIGURE 45A, is cupped at 420' to produce a curved end.

FIGURE 50 shows another embodiment of a rocker member construction. The rocker members 226a, at each end of the central pressing member 220a, may be identical with the corresponding members 226 and 220 elsewhere described, except that the ends 235a of the rocker members 226a are convex, as shown in FIGURE 50. The ends 220b of the pressing member 220a are concave, as shown in FIGURE 50. This permits the members 226a and 220a to be closer together and still permit rocking movement of rocker members 226a.

FIGURES 51 to 55 show another embodiment of this invention.

A center pressing member 330 has a center pressing member groove 332, which is best seen in FIGURE 54. The center pressing member 330 receives, in an initial position, a substantially straight preliminary groove-shaped bumper blank 332' which, in initial position, has straight ends 334 as shown in dotted lines in FIGURE 51, with the bumper blank ends extending beyond the pressing member 330.

A pair of rocker members 336 are provided at each end of said pressing member 330. In initial position, the rocker members, shown in dotted lines 336a, each have a rocker member groove 337, FIGURE 52, which in initial position is substantially aligned with the said pressing member groove 332, as shown in FIGURE 51, or in a position not to be in the way of the straight ends 334 of the bumper blank.

A punch member 338 has a central ridge member 340 relatively movable into the said pressure member groove 332 to an initial position to hold the bumper blank 332' in said pressing member groove 332, as shown in full lines in FIGURE 51. The punch member 338 has a pair of relatively movable punch and ridge members 342 respectively at each end of the central ridge member 338. These punch end ridge members 342 have a contour 343 and are movable transversely to the said ridge member 340 to produce an undulation 344 and a bend 346 at each end of said bumper blank.

The initial position of pressing member 330 is shown in FIGURE 51 in full lines. The initial position of the punch member 340 is shown in dotted lines at 340a, FIGURE 51. The initial position of the relatively movable punch and ridge members 342 is shown in dotted lines 342a, in FIGURE 51. The initial position of the rocker members 336 is shown in dotted lines at 336a, in FIGURE 51. When all of these members are in the initial positions just described, the bumper blank 332', in substantially straight condition, may be placed between these members, as shown in FIGURE 51, partly in full line at the center, and in dotted lines at 334 at the end of FIGURE 51. It is understood that FIGURE 51 is a symmetrical half-view of the apparatus, which is shown in full view in FIGURE 53.

The next stage is a movement of the parts to the position shown in full lines in FIGURE 51. That is, the punch member 340 moves from 340a to the full line position 340. The punch and ridge members 342 move from the dotted line positions 342a to the full line position 342. The rocker members 336 move from the dotted line position 336a to the full line position 336 after the members 342 are in full line position. When this happens, the bumper blank 332' is firmly gripped between the members 330 and 340, and the end 334 of the bumper is bent from the dotted line straight position 334 to the bent position 335, shown in full lines in FIGURE 51. This produces the end bends in the bumper blank.

The undulations 334 of FIGURE 53 are produced by movement from the full line position of FIGURE 51 to the full line position of FIGURE 53. The undulations 344 are produced by a downward movement of the center pressing member 330, and the central ridge member 340 to the position shown in full lines in FIGURE 53. During this downward movement, that is, downward in respect to the showing in FIGURE 53, but actually preferably in horizontal movement, the members 336 and 342 remain in stationary full line condition of FIGURE 53, in the position which they held in full line positions shown in FIGURE 51. This causes the members 330 and 334 to form the central part of the bumper 332' with an undulation 344 to produce a bump.

The bumper shown in FIGURES 51 to 54 may have a cross-section as shown in FIGURES 52 and 54, but such cross-section is not necessary. The outline of the end 351 of the longer wing of bumper is shown in dotted line 351a of FIGURE 53.

The movable members may be moved by hydraulic cylinder and piston constructions, as illustrated. For example, member 330 is moved by cylinder-piston 350. Punch member 340 is moved by cylinder-piston 352. Members 342 are moved respectively by the pair of cylinder-pistons 354, and the members 336 are moved respectively by the cylinder-pistons 356. These cylinder-pistons may be actuated hydraulically from a central pumping station, and may be automatically controlled by a program device of well-known construction, in which the desired sequences are automatically produced upon the pressing of a starting button, in a manner which is obvious to those skilled in the art of providing automatic controls for this type of machinery.

The members heretofore described in connection with FIGURES 51 to 55 may be slidably supported by proper supporting structure. For example, a horizontal base plate 360 has a plurality of grooved plates 364, 366, 367, 368, 369 and 370. These plates may be bolted on to the base plate 360 as shown, such as at 371. Also, these plates have proper grooves for holding and guiding the members which are attached thereto.

For example, the center pressing member 330 slides near each end respectively on two plates 364 and 366 which are bolted at 365 to the base plate 360.

Before the plates 364 and 366 are bolted to the base plate 360 sliding guides 372 and 373 are placed respectively in grooves 374 and 375 which are cut in the bottoms of the plates 364 and 366. The guide 372 is secured to the pressing member 330 by the screw bolts 376 after the guide 372 has been inserted in the groove 374.

Likewise, the guide 373 is placed in the groove 375 and is then bolted to the punch member 340 by screw bolts 377.

The guides 372 and 373 have offsets 378 and 379 respectively which are narrower than the main bodies of the guides, and these offsets 378 and 379 ride respectively in the narrower offset portions 380 and 381 of the grooves 374 and 375. This offset construction holds the pressing member 330 and the punch member 340 from being lifted off the plate 364 while permitting a horizontal sliding action under the guidance of grooves 374 and 375. A similar construction of guides and grooves holds the other ends respectively of the pressing member 330 and the punch member 340 against the plate 364 which is similar in construction to plate 366.

After the guides 372 and 373 have been secured to the plates 364 and 366, these plates are bolted at 365 to the base plate 360 so that the pressing member 330 and the punch member 340 are held in guided condition for horizontal reciprocation to produce the desired pressing action on the bumper blank 332'.

The rocker members 336 may be provided with screws 384 and 386 which ride in the grooves 388 and 390 in the plates 367 and 368, which plates are bolted to the base plate 360 by bolts 371. A second set of plates, such as plate 360' are held above the corresponding plates 367 and 368 and have corresponding grooves 388' and 390' to receive corresponding screws 384' and 386' which are attached to the rocker members 336. The plates 368' and the other plate, not shown, over plate 367 are supported on vertical L-shaped plates 368″ which are bolted at 371′ to the base plate 360 and at 371″ to the upper plates respectively.

The members 342 may have one or more bar-like members 380′, indicated in dotted lines in FIGURE 51 and in full lines in FIGURE 52, which slide within the grooves 382 in the plates 369 and 370. Any type of sliding construction may be used which holds the members 342 firmly in the forming position of FIGURE 51 during the forming operation of FIGURE 51 and also during the forming operation of FIGURE 53.

The cylinder-pistons 356 are connected by a connecting rod 392, connecting ears 394 and hinge pin 396 to the rocker members 336. The cylinder-pistons 356 are also secured by rocking pin constructions 398 to any firm securing means which is secured to the base plate 360, such as a strong bracket diagrammatically indicated at 400. The cylinder-pistons 352, 354 and 350 may be secured to the base plate 360 by any desired construction, such as straps or the like, 402, or any other similar holding means which may be used for this type of construction.

The original bumper blank 332′, 334 may be produced by the steps A-L of FIGURE 31 using aluminum alloy, as elsewhere specified, and the bumper blank 332′, 346 after the forming operation M, FIGURE 31, may be finished by steps N to S which have been elsewhere described.

In the operation of the embodiment of FIGURES 51–55, a substantially straight extruded bumper blank 332′, 334 of the general cross-section shown in FIGURES 52 and 54, and produced and treated as described in connection with steps A to L, FIGURE 31, is placed between the separated pressing member 330 and punch member 340 with member 340 in the dotted line position 340a of FIGURE 51 and with the rocker member 336 in 336a position and with the ridge members 342 in 342a position. Then the members 330, 340 and 336 are moved from the dotted positions in FIGURE 51 to the full line positions of FIGURE 51 to produce the curved ends 335 in the bumper blank. Thereafter, the pressing member 330 and the punch member 340 are moved from the full line position of FIGURE 51 to the full line position of FIGURE 53. This produces the bump or undulation 344 in the bumper.

Thereafter, the bumper is finished in accordance with the steps N–S of FIGURE 31.

FIGURES 56–59 show an embodiment in which the ends of the bumper blank are simultaneously given a longitudinal pull while the rocker member is being rocked from horizontal to vertical position. The pull preferably is applied in a manner to stretch the outer 20 inches at each end of the bumper blank. The stretch produced may be from ½–2 inches at each end of the bumper blank.

For example, in FIGURE 59, the inner curves 437 and 438 of the inner edges of the bend are in compression for about 40% of the inner area of the bend. The remaining or outer 60% of the area is in tension. The 40% compression area tends to wrinkle and the embodiment in FIGURES 56–59 creates a tension or pull on the ends of the blank during the bending operation, which tends to prevent the wrinkling action at the bend.

In order to accomplish this pulling action, means are provided to grasp the ends of the bumper blank which is located in the rocker members 226. Means are also provided to move the rocker members outwardly while the punch descends, so a pulling action is produced on the ends of the bumper to prevent the wrinkling action.

To this end the fulcrum pins 248 of the rocker members are moved outwardly during bending operation by cams 452 which move with the punch member.

For example, the rocker members 226 are carried by fulcrum pins 248 which are held in plates 258a. The plates 258a have horizontal slots 450 which permit the rocker members 226 to be pushed rightward in FIGURE 56 by cans 452 which are carried by the punch member 232. The cams 452 strike the fulcrum pins 248 outside of the support members 258a. If desired, the fulcrum pins 248 may be provided respectively with a roller 454 to make the cam action 452 more effective.

The gripping means 458 which are added at the end of the rocker member 226 are shown in FIGURES 56 and 58.

A gripping member 460 is moved up and down by a plunger 462, and a cylinder 464, which moves the pin 466 which carries and moves the gripping member 460. The short inner end 468 of the gripping member 460 has a slightly serrated under surface 470 which grips the end 472 of the unbent bumper. This gripping action takes place while the rocker member 226 is in horizontal position. As the plunger 232 starts to move down, the cams 452 move with it and hit the fulcrums 248 and start to push the rocker member 226 outward (rightward in FIGURE 56) while the gripping member 460 is in a slot 474 at the end of the rockable member. The outward movement caused by the cam 452 produces a pulling action on the bumper end 472 as the rocker arm bends around, and this stretching action prevents compression seams 473 (FIGURE 59) from being formed on the inside edge of the bent bumper.

The rocker member 226 is returned to inner position by a cam 476 which hits against a stationary member 478 which is carried on the press base structure 479.

If desired, the end clamping means 320 of FIGURES 35, 37 and 39 may be added to the rocker member construction of FIGURES 56–59. The gripping means of FIGURES 43 and 44 may be used in addition to or alternatively to the gripping means 460 of FIGURES 56 and 58. The gripping means of FIGURES 43 and 44 may be used to trip the ends of the bumper blank in the rocker member 226 of FIGURES 56–58 to produce a pull in combination with the cam 452 and outward movement of fulcrums 248 instead of, or in addition to, the gripping means 460 of FIGURES 56–58.

FIGURES 60–62 show another gripping means for the ends of the bumper blank. Such gripping means are somewhat similar to that of FIGURES 43 and 44 and are used with the rocker member outward movement of FIGURES 56–58.

FIGURES 60–62 show a rocker member 226 which has fulcrum pins 248 supported on pedestals 258 which have slots 450 similar to those shown in FIGURE 56. The punch member also carries cam members 452 which strike the rollers 454 at the outer ends of the fulcrums pins 248 at the outer ends of the fulcrum pins 248 to move the rocker members 226 horizontally outward at the same time that the punch member 232 is moving the rocker members 226 to vertical positions in the same manner described in connection with FIGURES 56–58.

However, means are provided to grip the ends of the bumper blank 202 throughout the lengths of the rocker members. Such means are somewhat similar to that disclosed in connection with FIGURES 43 and 44, but extend throughout the entire length of the rocker member.

Plunger constructions 510 near each end of the rocker members 226 actuate an inwardly movable bar 512 in a slot 514, both of which extend substantially throughout the length of the rocker member 226. The bar 512 is moved outwardly to receive the bumper blank. The bar 512 moves inward after the blank has been inserted and limits the upward movement of the upper edge 516 of the bumper blank 202, after having been moved in by plunger constructions 510.

Plunger constructions 518 near each end of rocker members 226 actuate inwardly movable bars 520 which extend substantially throughout the length of the rocker members 226 and which limit upward movement of the upper edge 522 of the bumper blank 202 after having been moved in by the plunger construction 518 in a manner similar to bar 512.

Two plunger constructions 524 at each end of the rocker member 226 upwardly move the grooved plunger 299a which receives the bumper blank, to cause the edges 516 and 522 to be pressed tightly upward against the bars 512 and 520 after the bumper blank has been previously installed with the bars 512 and 520 and plunger 299a in their retracted positions.

The lower edge of the bars 512 and 520 may be serrated a sufficient amount to cause the desired gripping action on the bumper ends to produce the ½ to 2 inch elongation, more or less, at each end of the bumper.

After the plunger constructions 510, 518 and 524 have gripped the straight bumper blank, the rocker members 226 are simultaneously rocked from horizontal to vertical positions by the plunger member 232 and are moved outwardly by cams 452 to stretch the ends of the bumper blank.

This action materially reduces the tendency of wrinkling 473 of FIGURE 59 along the inner edges of the bends of the bumper.

Sequential controls, manual or automatic, may be provided for all embodiments. If automatic, a program control may be provided which automatically actuates the desired number of parts in sequential manner after having been started by a starting push-button or the like.

FIGURES 63 and 68 inclusive discloses details of the apparatus and method for forming the flange 62 at each end of the bumper 26, which is shown in FIGURES 8 and 20.

The flanges 62 at each end of the bumper 26 cooperate with the additional portions 64 of the bumper construction of the car, as illustrated in FIGURE 21, to form a neat seam 66 and a strong junction at this point.

These flanges 62 are produced by the pair of dies 58 and 60 which are diagrammatically disclosed in FIGURES 12, 63 and 64.

The dies 58 and 60 of FIGURES 63 and 64 preferably are heated to a temperature of 350°–400° F. and receive the blank 542 from dies 44 and 46 of FIGURE 9 with unbent ends 550, while the blank is still at a temperature of from about 800° F. to 850° F., after being produced in the dies 44 and 46 of FIGURE 9.

FIGURES 63 and 64 show a construction of dies 58 and 60, which make a substantially 90° bend between the main body of the bumper 26 and the flange 62.

The drawing procedures in dies 58 and 60 of FIGURES 63 and 64 produce flanges 62, which have a substantially uniform thickness, such as .110 inch, notwithstanding that the main part of the bumper has a varying thickness, such as .240 inch at edge 28, .240 inch at edge 30, and .281 inch thickness at the impact curve 32, as previously described in connection with FIGURE 3.

The corner edge 526 of the die member or stationary punch 58 may be made with a substantially sharp 90° angle, which, in turn, produces a substantially 90° angle at 528, where the flange 62 meets the main body of the bumper on the inside of the bumper, as shown in FIGURES 65 and 66. The outer surface 530 is produced with a relatively small sharp curve 531, which has a relatively small radius 535, with its center at the point end of the arrowhead 534. This sharp curve makes a very neat seam 66 when adjacent the additional portion 64 of the bumper construction, as shown in FIGURE 21 and in dotted lines in FIGURES 65 and 66.

A steel construction of corresponding construction but without the varying thickness, etc., has a radius 537 at least twice as large about the center of the arrowhead 537a, as indicated in FIGURE 65, and this makes a wide and unsightly seam because of the large radius and widely curved surface.

FIGURE 67 shows how the bumper blank 542, including the relatively thick parts at impact curve 32 (and edges 28 and 38), is struck by the side plates 60a of the die 60 to form a flange which will be trimmed along line 62a to form flange 62. Such flange 62 may be pierced to form openings 76 for bolting the bumper 26 to the additional portion 64, FIGURE 21. The flanges 62 will be of uniform thickness, notwithstanding the irregular thicknesses in the main body of the bumper at 32, 28, and 30. This is also apparent from enlarged FIGURE 66.

The side plates 60a of the die member 60 have substantially flat inner impact sides 60b, which are spaced uniformly from the straight outer sides 58a of the stationary die member 58. In this embodiment the sides 58a are spaced substantialy .110 inch from the inner surfaces 60b of the side members 60a, which is a distance substantially equal to the thickness of the flange 62.

The substantially smooth straight sides of the flange 62 permit such flange to be firmly and neatly secured or bolted to the additional member 64 as indicated in dotted lines in FIGURES 65 and 66.

Before trimming and piercing, the bumper 26 may be quenched, as in FIGURE 14, so the bumper may be trimmed, artificially aged, polished, buffed, chemically brightened and anodized, as indicated in FIGURES 15–19, to produce the bumper 26 of FIGURE 20 in readiness to be secured to the additional part 64.

The die member 60 may comprise a pair of side plates 62a which have their lower edges 540 shaped substantially the same as the top surface 541 of the blank 542 of FIGURE 64, when the blank has been finished in dies 44 and 46 of FIGURE 9. The inside lower corner 544 of the side plates 62a may be slightly rounded, as shown in FIGURE 63.

The side plates 62a may be carried by a plate 546, which is actuated by reciprocable rods 548, by well-known mechanism.

The blank 542 is substantially longitudinally straight, so its ends 550 extend slightly beyond the sides 58a of the die member 58. The ends 550 extend into the space underneath the edges 540 of the side plates 60a and will be struck when the side plates 60a are moved down by the plunger rods 548 to form the flanges 62, FIGURE 67.

If desired, the die member 60 may be provided with blank holding means 552 which are actuated by plungers 554, which pass through suitable openings in plate 546. The lower surfaces of the holding means 552 may coincide with the end parts of the top surface 541 of the blank 542. The blank may be held down by the holding means 552 while the die member side plates 60a are moving down to strike the ends 550 of the blank 542.

The die member 58 has a stationary member 556 which is supported on base plate 558 and has straight sides 58a suitably spaced from the planes of the inner sides 60b of the plates 60a (such as a space of .011 inch in the specific embodiment described in connection with FIGURE 3). The supporting surfaces of the die member 556 near the ends of the blank are substantially of the same shape as the under surface 541a of said blank. The plates 60a are moved down with their sides 60b moving in parallel with the outer sides 58a of the stationary member 556. The suitably curved lower edges 540 of the plates 60a substantially simultaneously strike the upper surfaces of the ends 550 which extend into the downward path of the plates 60a. This simultaneous strike enables the plates 60b to hold the blank and bend and form the ends 550 into flanges of uniform thickness which extend to or below the trim line 62a which forms the finish line of the flanges 62, as shown in FIGURE 67.

If desired, the hold down members 552 and 554 may be used to insure a proper strike.

The side plates 60a may move down on the strike so the lower edges move to or below the trim line 62a of FIGURE 64. For example, the plates may move down to some lower limit portion, such as 62b, which is well below the trim line 62a. The flash of the flanges 62 may extend to the line 62b, or to any line below line 62b. The side plates 60a may be moved down only enough to provide substantially parallel sided flanges to the trim line 62a and any excess material from the overhanging edges 550 of FIGURE 63 need not be completely flattened below the line 62a.

In this manner, a substantially 90° sharp angle is produced at the corner 528 of FIGURES 65–67 and a relatively small radius curve 530 is produced on the outside end edge of the bumper construction.

FIGURE 69 et seq. show other embodiments of a bumper made according to the objects of this invention.

The bumper 600 may be a metallic automotive bumper and include an extrusion 602 of an aluminum containing metallic material such as an aluminum alloy as herein set forth. The material may be prepared and extruded as herein disclosed, and the extrusion may be formed into a bumper of any shape by any of the steps, apparatus and methods herein disclosed, with appropriate modifications to produce the embodiments of FIGURES 69 et seq., now readily apparent to those skilled in the art, in view of the disclosure herein.

FIGURE 69 shows a bumper in perspective with bent ends somewhat similar to those in the embodiment shown in FIGURES 40–49. However, the principles of the invention disclosed in connection with FIGURES 69 et seq. may also be applied to the bumpers of the other embodiments herein previously disclosed.

The extrusion 602 of FIGURE 70 may include enlarged edges 604 and 605 and an impact insert receiving groove or identation 608 which has tapered or gripping edges 610 which are tapered outwardly behind the opening lips 612 toward the groove bottom floor 614 in a manner to hold the impact insert member 616 in a firm and secure manner.

The impact insert member 616 may be an impact receiving band or longitudinal insert which extends along a part or along the entire length of the bumper. It may be made of any material suitable effectively to receive and absorb the usual impact which a bumper is intended to absorb. The material also may be of any type which may be inserted in a groove of the character shown in FIGURES 69 et seq., in any suitable manner, for example, as by forcibly inserting the outwardly flared attaching flange 618 in the groove 608 by the action of a suitable plunger, hammer or mallet, or the like. For example, such material may be a material which has the characteristics of hard rubber or rubber-like material, either of natural or synthetic nature. Hard black rubber may be used if desired.

When desired, the exposed impact body 620 may have a rounded impact surface 622 and may have flanges 624 which are biased during construction so such flanges press firmly and tightly against the outer metallic surface of the bumper.

For example, the extrusion 602 may be treated and formed by the apparatus and methods disclosed in connection with FIGURES 1–62 inclusive and 34A, and, for example, in connection with FIGURES 32–50 and 34A, with modifications made obvious by this disclosure. The extrusion may be completed into a form such as shown in FIGURE 69, or into any of the forms shown in FIGURES 1 to 62 inclusive and 34A, with an inward groove added of the form shown in FIGURES 69 et seq. Thereafter, the impact insert shown in these FIGURES 69 et seq. may be inserted in such inward groove.

In the embodiment of FIGURES 71 and 72 the parts which are similar to certain parts of FIGURES 69 and 70 are numbered with similar reference numerals to which the suffix A has been added. The description of such similar parts is not repeated where the description of the corresponding parts in FIGURES 69 and 70 are substantially equally applicable.

In FIGURES 71 and 72, the curved portions 630 of the extrusion merge with the substantially straight portions 632 which form substantially flat aligned outer surfaces 634 which receive the slightly biased flanges 624A of the insert 616A with a tight contact between the edges 636 of the insert and the outer surface of the metallic bumper substantially at the merging point 638 of the curved portions 630 with the flat surfaces 634.

With the construction disclosed in connection with FIGURES 69 et seq., an attractive bumper is produced and an efficient method of manufacturing the same is provided in which the normal substantially harmless impacts, such as during parking, etc., are readily absorbed without damage either to the bumper of FIGURES 69 et seq., or to the adjacent car which may be impacted during the parking operation of either car.

In all of the forming steps herein described, the desired heat of the blank may be a residual heat from a previous operation, or the heat may be heat (additional or original) introduced for a particular forming step.

The punch members and die members of all of the embodiments herein disclosed may be heated by electric heaters or the like to temperature on the order of 350°–400° F. or other desired temperature. The bumper blanks or other articles produced and treated in connection with all of the embodiments herein disclosed may be treated according to any or all of the steps diagrammatically shown in FIGURE 31 and described in connection therewith in the specification. The aluminum containing metallic material in all of the bumpers herein described may be aluminum alloy material of the character herein specified.

Improved articles such as the aluminum alloy bumpers herein disclosed and the like, are thus provided. These articles are made by the improved apparatus and the improved methods herein disclosed.

While the form of the invention now preferred has been disclosed as required by the statutes, other forms may be provided, all coming within the scope of the claims which follow.

While the form of the invention now preferred has been disclosed as required by the statutes, other forms may be used, all coming within the scope of the claims which follow.

What is claimed is:

1. A blank for an aluminum containing metallic automotive vehicle bumper formed from an irregularly cross-sectioned extrusion.

2. A blank for an aluminum containing metallic automotive vehicle bumper in which the outermost impact zone is thicker than the main body of said bumper.

3. A blank for an aluminum containing metallic automotive vehicle bumper in which the upper and lower edges are thicker than the main body of said bumper.

4. A blank for a metallic automotive vehicle bumper formed from an irregularly cross-sectioned extrusion.

5. A metallic blank for an automotive vehicle bumper in which the outermost impact zone is thicker than the main body of said bumper.

6. A metallic blank for an automotive vehicle bumper in which the upper and lower edges are thicker than the main body of said bumper.

7. A blank for forming an irregular thickness transverse cross section, heat treated and tempered, aluminum alloy automotive vehicle bumper, said blank being formed from a heat treatable aluminum alloy, and having an irregular thickness transverse cross section, said blank having a generally uniform longitudinal cross section for forming, heat treating and tempering said bumper.

8. A blank for forming an irregular thickness, transverse cross section, heat treated and tempered, aluminum alloy automotive vehicle bumper having a central longitudinal impact ridge means thicker than the general transverse cross section thickness of said bumper, said blank being made of a heat treatable aluminum alloy and having a central longitudinal impact ridge means thicker than the general transverse cross section thickness of said blank, said blank having a generally uniform longitudinal cross section for forming, heat treating and tempering said bumper.

9. A blank for forming an irregular thickness transverse cross section, heat treated and tempered, aluminum alloy automotive vehicle bumper having longitudinal edge means thicker than the general transverse cross section thickness of said bumper, said blank being made of a heat treatable aluminum alloy and having longitudinal edge means thicker than the general transverse cross section thickness of said blank, said blank having a generally uniform longitudinal cross section for forming, heat treating and tempering said bumper.

10. A blank for forming an irregular thickness transverse cross section, heat treated and tempered, aluminum alloy automotive vehicle bumper having a central longitudinal impact ridge means thicker than the general transverse cross section of said bumper, said bumper also having longitudinal edge means thicker than the general transverse cross section thickness of said bumper, said blank being made of a heat treatable aluminum alloy and having a central longitudinal impact ridge means thicker than the general transverse cross section of said blank, said blank also having longitudinal edge means thicker than the general transverse cross section thickness of said blank, said blank having a generally uniform longitudinal cross section for forming, heat treating and tempering said bumper.

References Cited

UNITED STATES PATENTS

| | | | |
|---|---|---|---|
| 343,467 | 6/1886 | MacPhail | 29—193 |
| 1,601,559 | 9/1926 | Clark | 29—190 |
| 2,207,004 | 7/1940 | Gruber et al. | 29—183.5 |
| 2,274,056 | 2/1942 | Geiger | 148—2 |

DAVID L. RECK, *Primary Examiner.*

R. O. DEAN, *Assistant Examiner.*